＃US009864937B2

United States Patent
Saito

(10) Patent No.: US 9,864,937 B2
(45) Date of Patent: Jan. 9, 2018

(54) IMAGE RECORDING APPARATUS, METHOD OF CONTROLLING IMAGE RECORDING APPARATUS, AND STORAGE MEDIUM

(71) Applicant: CANON KABUSHIKI KAISHA, Tokyo (JP)

(72) Inventor: Senichi Saito, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/135,414

(22) Filed: Apr. 21, 2016

(65) Prior Publication Data
US 2016/0342870 A1 Nov. 24, 2016

(30) Foreign Application Priority Data
May 18, 2015 (JP) .................. 2015-101186

(51) Int. Cl.
| G06K 15/00 | (2006.01) |
| G06K 15/16 | (2006.01) |
| G06K 15/10 | (2006.01) |
| B65H 5/24 | (2006.01) |
| B65H 7/14 | (2006.01) |
| G06K 9/00 | (2006.01) |
| G06K 9/46 | (2006.01) |
| B41J 13/00 | (2006.01) |

(52) U.S. Cl.
CPC ...... *G06K 15/4025* (2013.01); *B41J 13/0018* (2013.01); *B65H 5/24* (2013.01); *B65H 7/14* (2013.01); *G06K 9/00456* (2013.01); *G06K 9/4652* (2013.01); *G06K 15/102* (2013.01); *G06K 15/16* (2013.01); *B65H 2801/03* (2013.01); *G06K 2215/101* (2013.01)

(58) Field of Classification Search
CPC .. G06K 15/4025; G06K 15/16; G06K 15/102; B65H 7/14; B65H 5/24
USPC ..................................................... 358/1.12
See application file for complete search history.

(56) References Cited

U.S. PATENT DOCUMENTS

| 2001/0033389 A1* | 10/2001 | Kurihara | ............... B41J 13/0018 358/1.12 |
| 2005/0088670 A1* | 4/2005 | Folkins | ................... G03G 15/50 358/1.4 |
| 2015/0352870 A1* | 12/2015 | Imafuku | ............... B41J 13/0009 347/5 |

FOREIGN PATENT DOCUMENTS

JP 2000-62975 2/2000

* cited by examiner

*Primary Examiner* — Neil R McLean
(74) *Attorney, Agent, or Firm* — Fitzpatrick, Cella, Harper & Scinto

(57) ABSTRACT

Provided is an image recording apparatus, including: a recording unit recording an image on a recording sheet; a conveying unit conveying a plurality of recording sheets in an overlapping state to the recording unit; and a setting unit setting an overlapping amount so that the image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other.

17 Claims, 18 Drawing Sheets

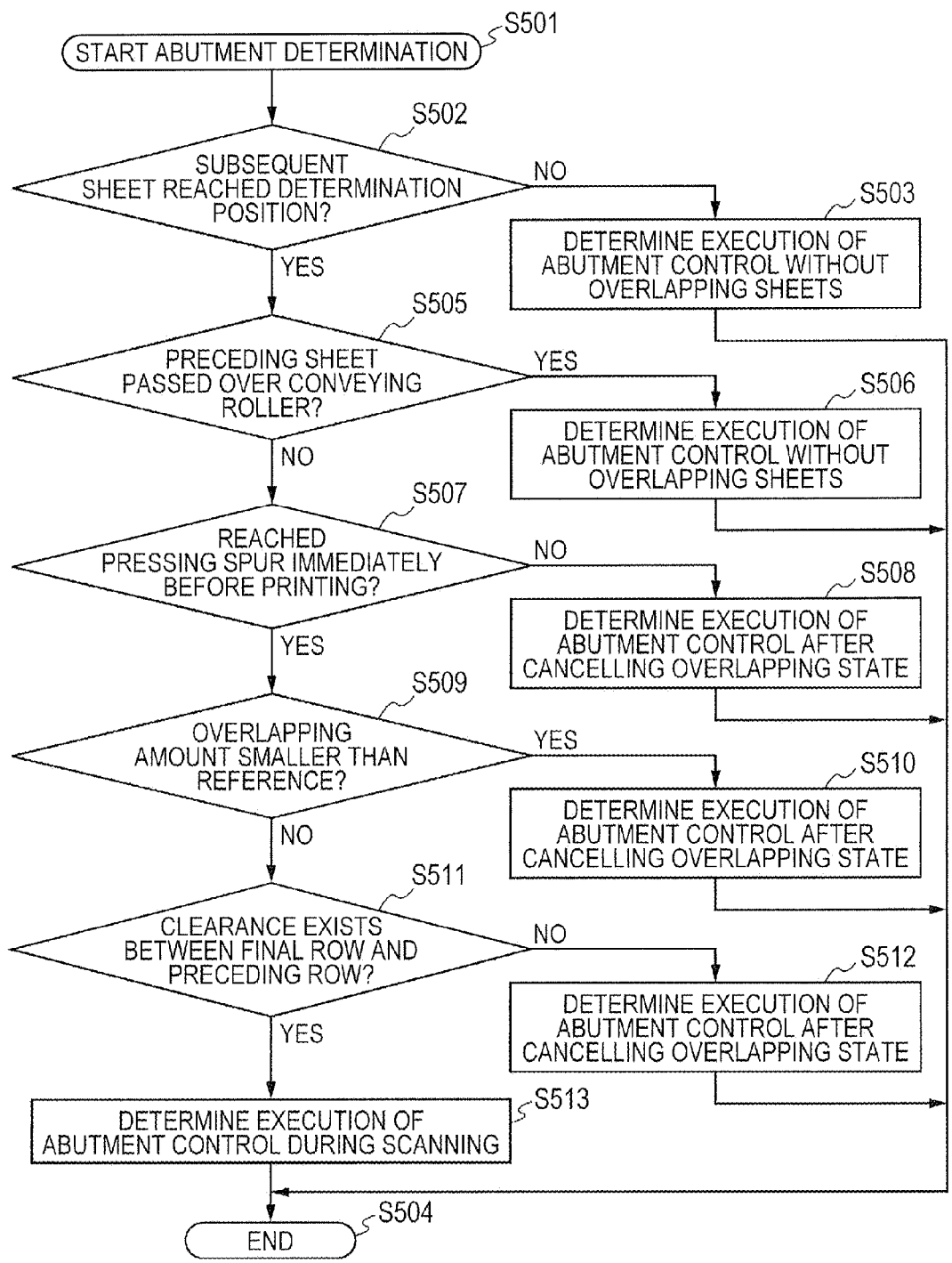

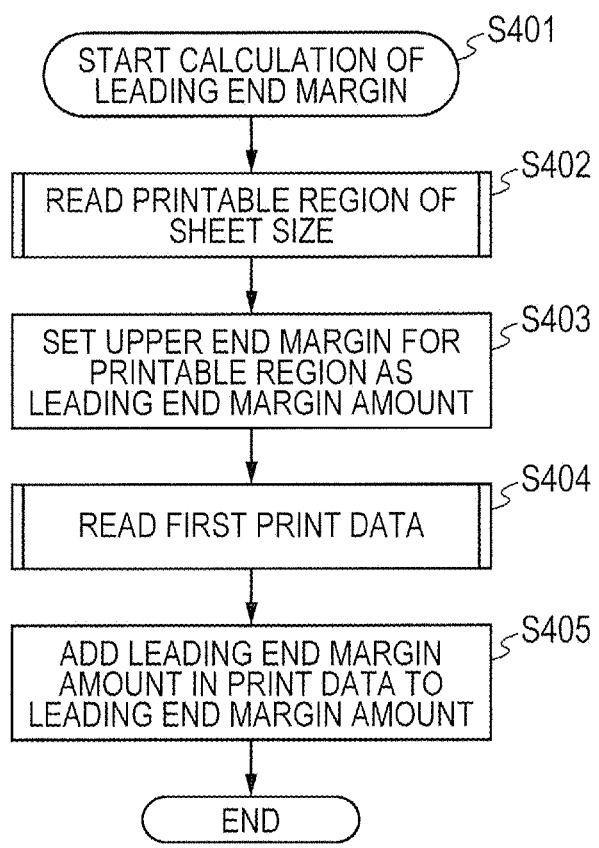

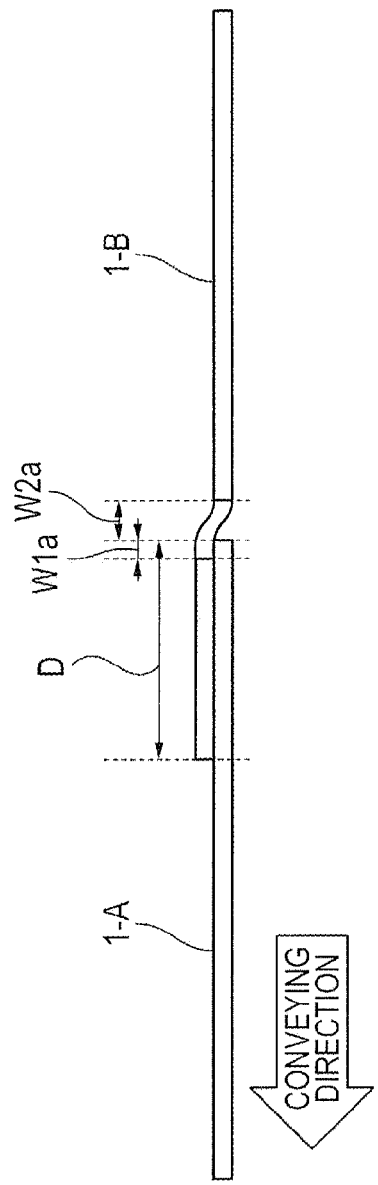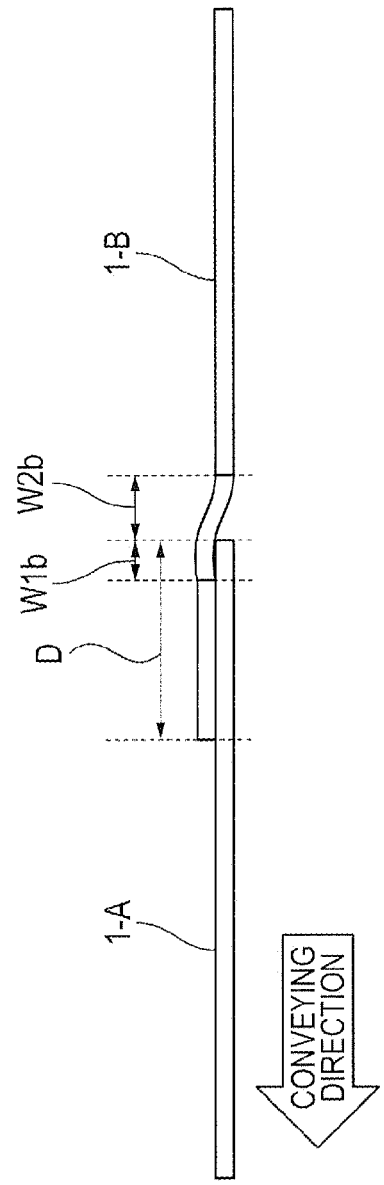

IMAGE RECORDING APPARATUS, METHOD OF CONTROLLING IMAGE RECORDING APPARATUS, AND STORAGE MEDIUM

BACKGROUND OF THE INVENTION

Field of the Invention

The present invention relates to a recording apparatus configured to perform recording on a sheet with a recording head, and more particularly, to an image recording apparatus configured to convey a sheet to a recording region opposed to the recording head under a state in which a part of a subsequent sheet is superposed on a part of a preceding sheet.

Description of the Related Art

There is known an image recording apparatus configured to convey a preceding sheet and a subsequent sheet in an overlapping state while an image recording region of the preceding sheet and an image recording region of the subsequent sheet do not overlap each other (for example, Japanese Patent Application Laid-Open No. 2000-62975).

There is described in Japanese Patent Application Laid-Open No. 2000-62975 that, when a part of the subsequent sheet is superposed on a part of the preceding sheet, the subsequent sheet has a boundary between a region under which the preceding sheet is present and a region under which the preceding sheet is not present.

Over the region of the subsequent sheet under which the preceding sheet is not present, a distance between the subsequent sheet and a head varies. Over the region of the subsequent sheet under which the preceding sheet is present, at a part located away from the boundary between the region under which the preceding sheet is present and the region under which the preceding sheet is not present, the distance between the subsequent sheet and the head does not vary. Therefore, in the above-mentioned part of the region, only a single adjustment of ink ejection timing can precisely correct an ink impact position.

At a part in the vicinity of the boundary in the region under which the preceding sheet is present, the subsequent sheet may be warped. The subsequent sheet is inclined between the boundary and a region where the subsequent sheet starts to come in contact with a platen plate. Therefore, in the vicinity of the boundary, a distance between an upper surface of the subsequent sheet and the head varies in a stepwise manner. Therefore, when an image is recorded in the vicinity of the boundary, the ink impact position is misregistered. Such misregistration causes a problem of distortion in an image.

The description above concerns the case of conveying two sheets, that is, the preceding sheet and the subsequent sheet. Even in a case where three or more sheets are conveyed, the same problem as that described above occurs.

SUMMARY OF THE INVENTION

The present invention has an object to provide an image recording apparatus configured to convey a plurality of recording sheets in an overlapping state to a recording unit without distorting a printed image on a subsequent sheet in a vicinity of a boundary between a region under which a preceding sheet is present and a region under which the preceding sheet is not present, a method of controlling the image recording apparatus, and a storage medium having a program stored thereon.

According to one embodiment of the present invention, there is provided an image recording apparatus, including: a recording unit recording an image on a recording sheet; a conveying unit conveying a plurality of recording sheets in an overlapping state to the recording unit; and a setting unit setting an overlapping amount so that the image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other.

According to one embodiment of the present invention, there is provided a method of controlling an image recording apparatus, including: setting an overlapping amount so that an image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other; conveying the subsequent sheet and the preceding sheet in an overlapping state; and recording the image on the subsequent sheet.

According to one embodiment of the present invention, there is provided a non-transitory computer-readable storage medium having a program stored thereon, the program causing an image recording apparatus to execute: setting an overlapping amount so that an image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other; conveying the subsequent sheet and the preceding sheet in an overlapping state; and recording the image on the subsequent sheet.

Further features of the present invention will become apparent from the following description of exemplary embodiments with reference to the attached drawings.

BRIEF DESCRIPTION OF THE DRAWINGS

FIGS. 5B-1, 5B-2 and 5C are views for illustrating the operation for superposing the subsequent sheet on the preceding sheet according to the first embodiment.

FIG. 6 is a flowchart for illustrating a head feeding operation of the subsequent sheet according to the first embodiment.

FIG. 7 is a flowchart for illustrating an operation of calculating a leading end margin amount of the subsequent sheet.

FIGS. 9A and 9B are views for illustrating cross sections when the subsequent sheet is superposed on the preceding sheet.

DESCRIPTION OF THE EMBODIMENTS

Now, embodiments of the present invention are described with reference to the accompanying drawings.

First Embodiment

FIG. 1A to FIG. 1C, FIG. 1D to FIG. 1F, and FIG. 1G to FIG. 1I are sectional views for illustrating an overlapping sheet feeding operation according to embodiments of the present invention. First, a schematic configuration of a recording apparatus PR1 applicable to the embodiments is described with reference to FIG. 1A.

Figure 1A:
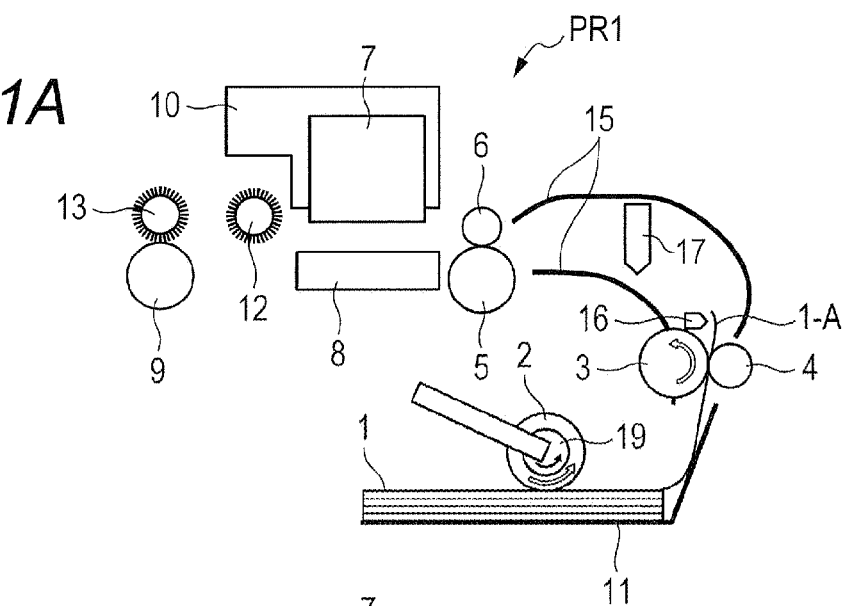
FIGS. 1A, 1B and 1C are sectional views for illustrating an overlapping sheet feeding operation according to embodiments of the present invention.

In FIG. 1A, a plurality of recording sheets 1 are stacked on a sheet feeding tray 11. The recording sheet is also referred to as "recording medium" or "recording paper". A sheet that precedes is referred to as "preceding sheet" or "preceding paper", and a sheet that is subsequent to the preceding sheet is referred to as "subsequent sheet" or "subsequent paper". The first embodiment relates to a case where the number of recording sheets 1 is two. Theoretically, the number of recording sheets 1 is not limited to two, and may be three or more.

A pickup roller 2 is brought into abutment against an uppermost one of the recording sheets 1 stacked on the sheet feeding tray 11 to pick up the uppermost recording sheet 1. A sheet feeding roller 3 feeds the recording sheet 1 that has been picked up by the pickup roller 2 to a downstream side in a sheet conveying direction. A driven sheet feeding roller 4 is urged toward the sheet feeding roller 3 so that the driven sheet feeding roller 4 and the sheet feeding roller 3 sandwich the recording sheet 1 therebetween to feed the recording sheet 1.

A conveying roller 5 conveys the recording sheet 1, which is fed by the sheet feeding roller 3 and the driven sheet feeding roller 4, to a position that faces a recording head 7. A pinch roller 6 is urged toward the conveying roller 5 so that the pinch roller 6 and the conveying roller 5 sandwich the recording sheet 1 therebetween to convey the recording sheet 1.

The recording head 7 performs recording on the recording sheet 1 conveyed by the conveying roller 5 and the pinch roller 6. In the first embodiment, ink is ejected from the recording head 7 as an inkjet recording head to perform recording on the recording sheet 1. A platen plate 8 supports a back surface of the recording sheet 1 at a position opposed to the recording head 7. A carriage 10 having the recording head 7 mounted therein moves in a direction that intersects with the sheet conveying direction.

A delivery roller 9 delivers the recording sheet on which the recording has been performed by the recording head 7 out of the recording apparatus PR1. Spurs 12 and 13 come in contact with a recording surface of the recording sheet 1 on which the recording has been performed by the recording head 7 to rotate. The spur 13 located on a downstream side is urged toward the delivery roller 9. The delivery roller 9 is not arranged at a position to which the spur 12 on an upstream side is opposed. The spur 12 prevents uplift of the recording sheet 1, and is also referred to as "pressing spur".

The recording sheet 1 is guided by conveying guides 15 between a sheet feeding nip portion, which is formed by the sheet feeding roller 3 and the driven sheet feeding roller 4, and a conveying nip portion, which is formed by the conveying roller 5 and the pinch roller 6. A sheet detecting sensor 16 detects a leading edge and a trailing edge of the recording sheet 1. The sheet detecting sensor 16 is provided downstream of the sheet feeding roller 3 in the sheet conveying direction. A sheet presser lever 17 superposes a leading end portion of the subsequent sheet on a trailing end portion of the preceding sheet. The sheet presser lever 17 is urged by a spring in a clockwise direction in FIG. 1A to FIG. 1C, FIG. 1D to FIG. 1F, and FIG. 1G to FIG. 1I.

Figure 1B:
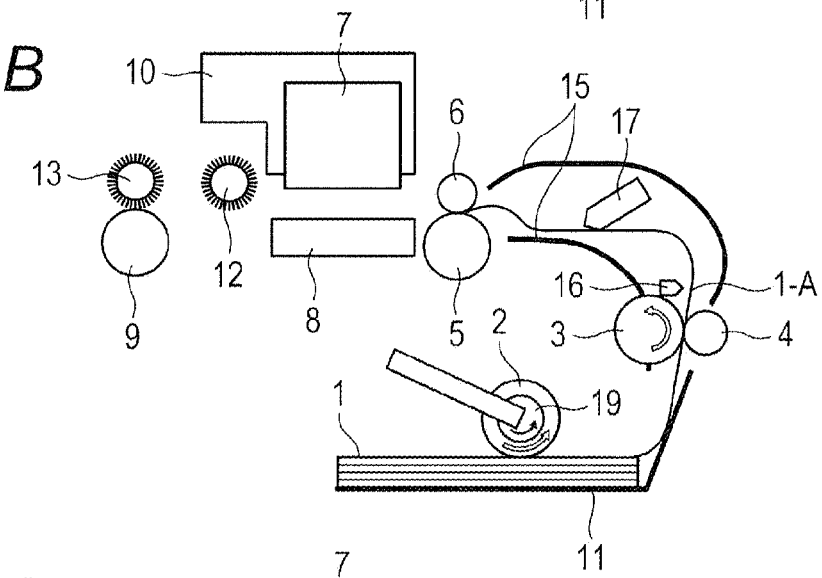
Figure 1C:
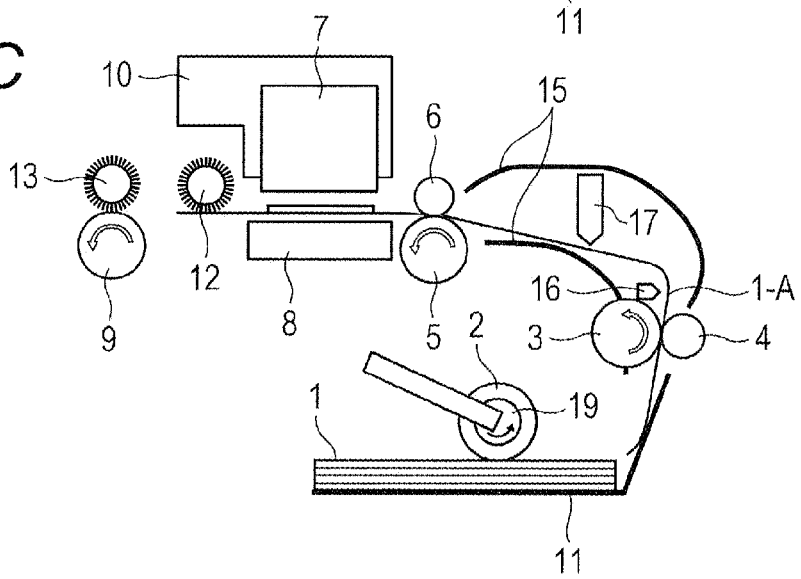
Figure 1D:
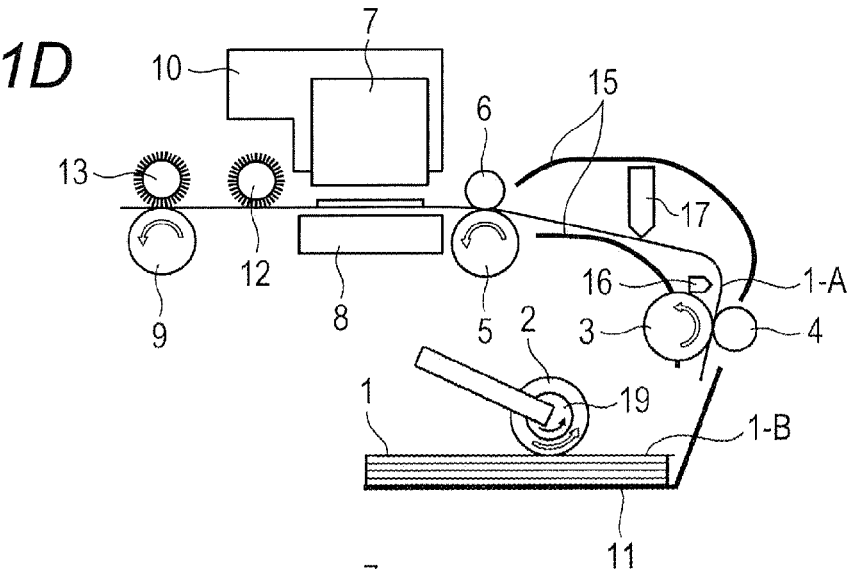
FIGS. 1D, 1E and 1F are sectional views for illustrating the overlapping sheet feeding operation according to the embodiments.
Figure 1E:
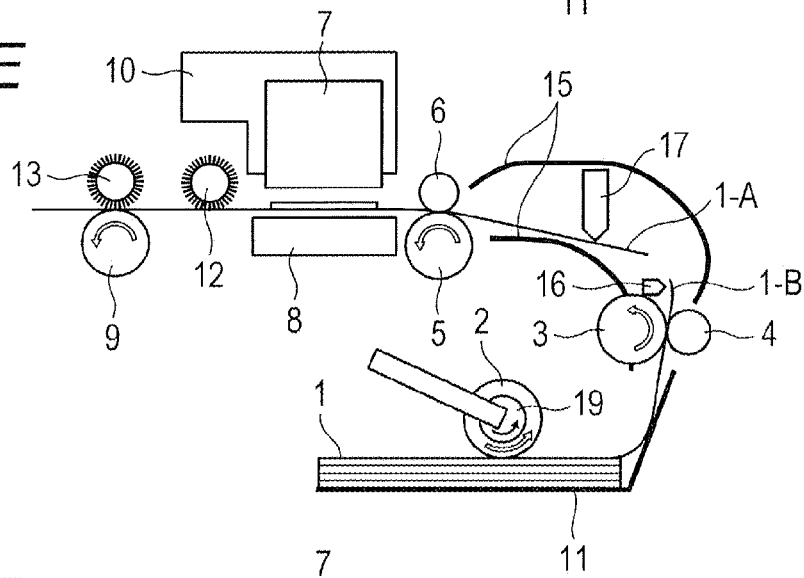
Figure 1F:
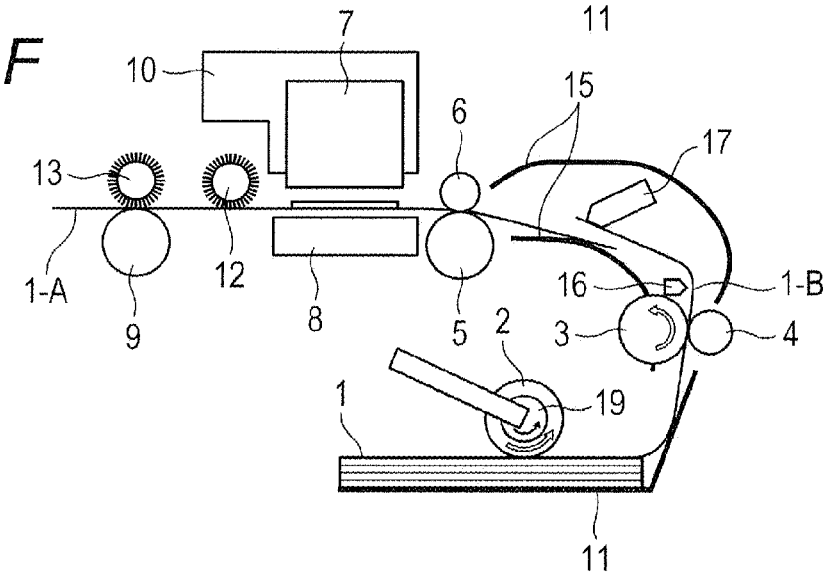
Figure 1G:
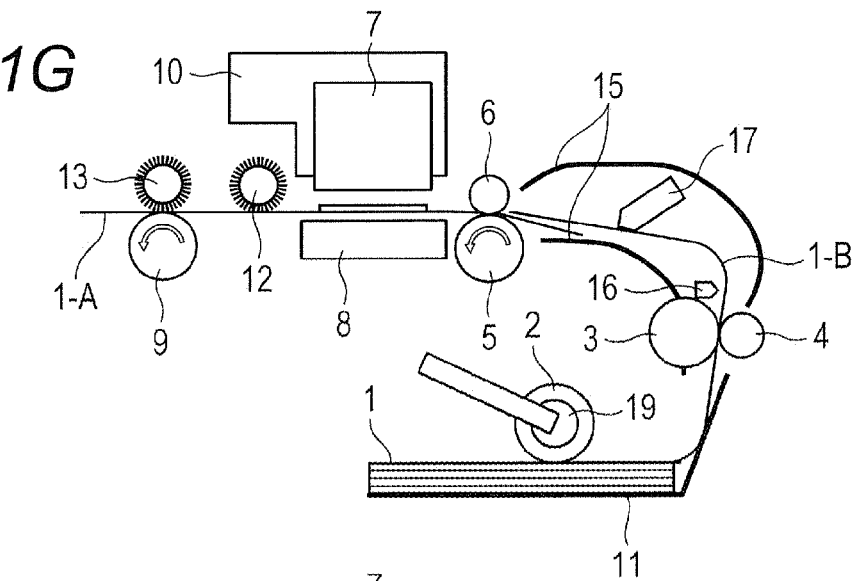
FIGS. 1G, 1H and 1I are sectional views for illustrating the overlapping sheet feeding operation according to the embodiments.
Figure 1H:
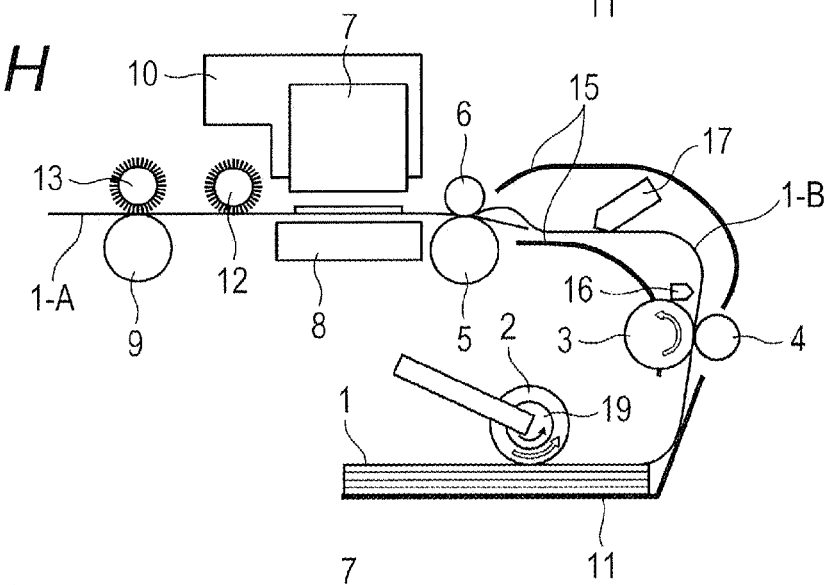
Figure 1I:
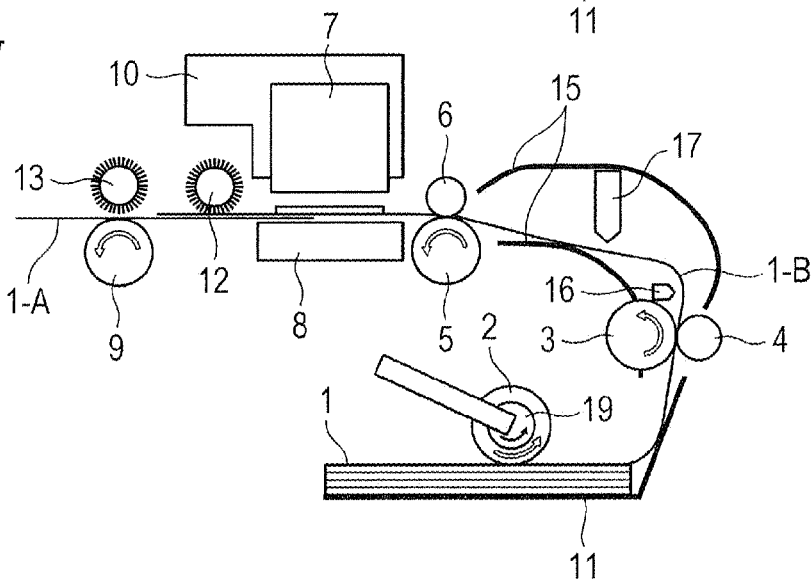
Figure 2A:
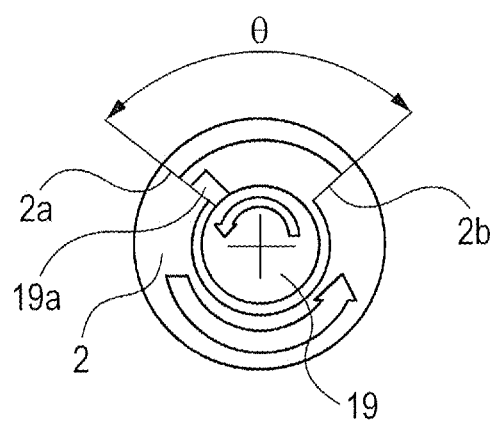
FIGS. 2A and 2B are views for illustrating a configuration of a pickup roller 2.
Figure 2B:
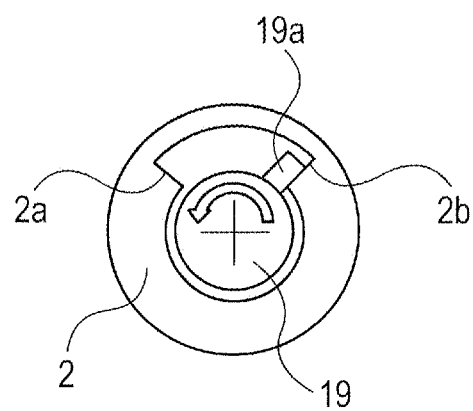

FIG. 2A and FIG. 2B are views for illustrating a configuration of the pickup roller 2. The pickup roller 2 is brought into abutment against the uppermost one of the recording sheets 1 stacked on the sheet feeding tray 11 to pick up the recording sheet 1. A drive shaft 19 transmits a drive of a sheet feeding motor to the pickup roller 2. When picking up the recording sheet 1, the drive shaft 19 and the pickup roller 2 rotate in a direction indicated by the arrows (counterclockwise direction) in FIG. 1A to FIG. 1C, FIG. 1D to FIG. 1F, and FIG. 1G to FIG. 1I. A projection 19a is formed on the drive shaft 19. A recessed portion into which the projection 19a fits is formed in the pickup roller 2.

As illustrated in FIG. 2A, when the projection 19a is held in abutment against a first surface 2a of the recessed portion of the pickup roller 2, the drive of the drive shaft 19 is transmitted to the pickup roller 2. Thus, when the drive shaft 19 is driven, the pickup roller 2 is also driven.

As illustrated in FIG. 2B, when the projection 19a is held in abutment against a second surface 2b of the recessed portion of the pickup roller 2, the drive of the drive shaft 19 is not transmitted to the pickup roller 2. Thus, even when the drive shaft 19 is driven, the pickup roller 2 is not driven. When the projection 19a is present between the first surface 2a and the second surface 2b without being held in abutment against any of the first surface 2a and the second surface 2b, the pickup roller 2 is not driven even by driving the drive shaft 19.

Figure 3:
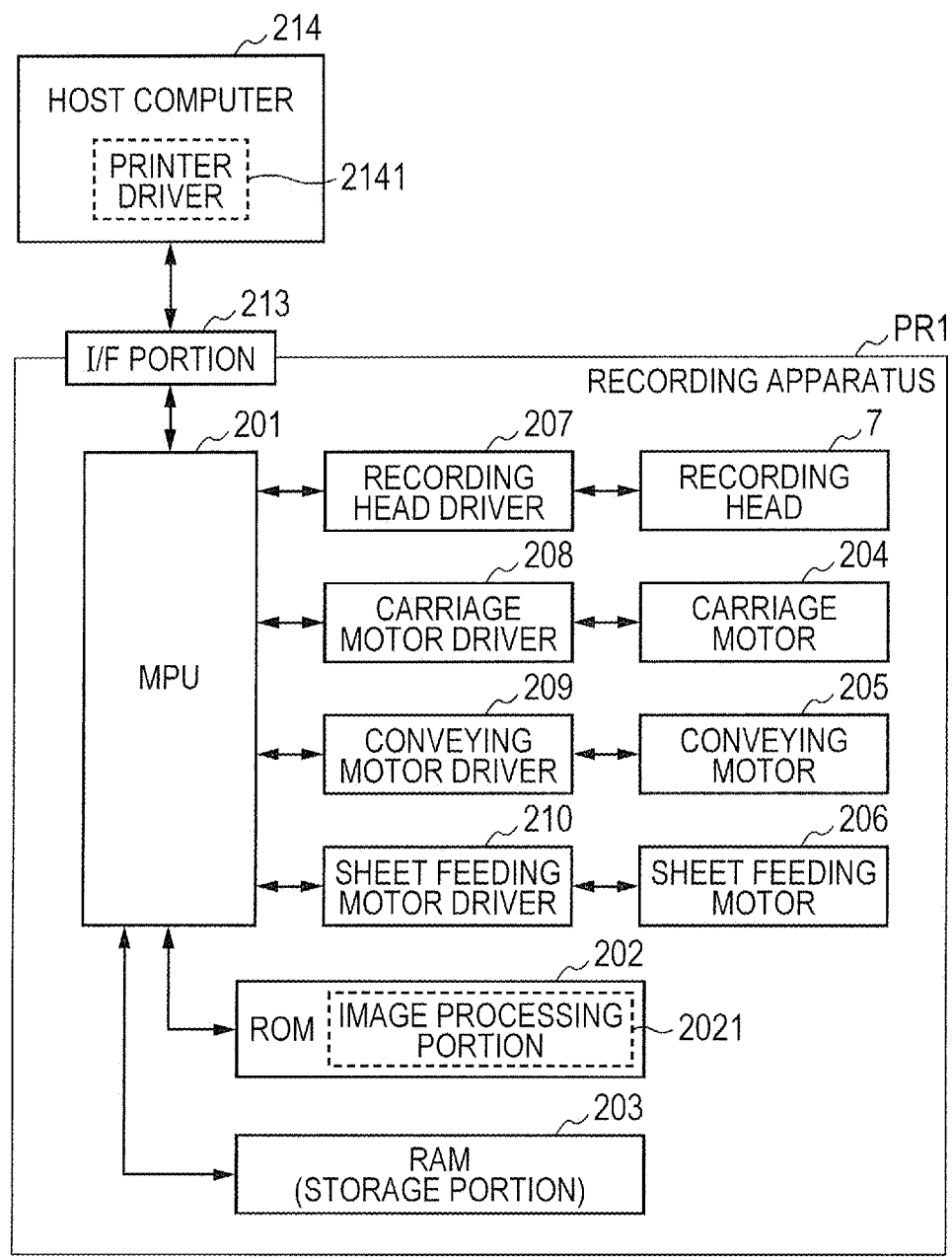
FIG. 3 is a block diagram for illustrating a recording apparatus.

FIG. 3 is a block diagram for illustrating the recording apparatus PR1 according to the first embodiment. An MPU 201 controls an operation of each portion, data processing, and the like. Specifically, the MPU 201 collectively controls components included in the recording apparatus PR1 illustrated in FIG. 3 to execute various programs stored in a ROM 202 on a RAM 203 as a work memory, thereby controlling the recording apparatus PR1. An image processing portion 2021 is a storage region for various programs stored in the ROM 202.

The recording head 7 is controlled by the MPU 201 through intermediation of a recording head driver 207 so as to print data to be printed, which is read into the RAM 203, onto a print medium. Specifically, the RAM 203 is configured to be used as a work area for the MPU 201, used as a temporary storage area for various received data, and store various setting data. Recording data (print data) transmitted from a host computer 214, specifically, recording data to be recorded (printed) by the recording head 7 is temporarily stored in the RAM 203.

A carriage motor 204 configured to drive the carriage 10 is controlled by a carriage motor driver 208. The conveying roller 5 and the delivery roller 9 are driven by a conveying motor 205. The conveying motor 205 is controlled by a conveying motor driver 209. The pickup roller 2 and the sheet feeding roller 3 are driven by a sheet feeding motor 206. The sheet feeding motor 206 is controlled by a sheet feeding motor driver 210.

A printer driver 2141 is provided to the host computer 214. The printer driver 2141 is configured to gather recording information, such as images to be recorded and quality of the images to be recorded, and communicate with the recording apparatus PR1 when a command for execution of printing is given by a user. The MPU 201 receives and transmits the images to be recorded and the like from and to the host computer 214 through intermediation of an I/F portion 213.

Although the recording apparatus PR1 is described as a single apparatus in this embodiment, the recording apparatus may be separated into a controller (control device) including the I/F portion 213, the MPU 201, the RAM 203 and the ROM 202, and a printer engine including the recording head 7, the recording head driver 207, the carriage motor 204, the carriage motor driver 208, the conveying motor 205, the conveying motor driver 209, the sheet feeding motor 206 and the sheet feeding motor driver 210.

An overlapping sheet feeding operation is described in time series with reference to FIG. 1A to FIG. 1C, FIG. 1D to FIG. 1F, and FIG. 1G to FIG. 1I. When the print data is transmitted from the host computer 214 via the I/F portion 213, the print data is processed in the MPU 201. Thereafter, the MPU 201 that expands the data into the RAM 203 starts a recording operation based on the data.

Description is now made with reference to FIG. 1A. First, the sheet feeding motor 206 is driven at a low speed by the sheet feeding motor driver 210. The pickup roller 2 is rotated at 7.6 inch/sec. When the pickup roller 2 is rotated, the uppermost one (preceding sheet 1-A) of the recording sheets 1 stacked on the sheet feeding tray 11 is picked up. The preceding sheet 1-A that has been picked up by the pickup roller 2 is conveyed by the sheet feeding roller 3 that rotates in the same direction as that of rotation of the pickup roller 2. The sheet feeding roller 3 is also driven by the sheet feeding motor 206.

When a leading edge of the preceding sheet 1-A is detected by the sheet detecting sensor 16 that is provided on the downstream side of the sheet feeding roller 3, the sheet feeding motor 206 is switched to be driven at a high speed. Specifically, the pickup roller 2 and the sheet feeding roller 3 are rotated at 12 inch/sec.

Next, description is made with reference to FIG. 1B. By continuously rotating the sheet feeding roller 3, the leading edge of the preceding sheet 1-A rotates the sheet presser lever 17 in a clockwise direction. Further continuous rotation of the sheet feeding roller 3 brings the leading edge of the preceding sheet 1-A into abutment against the conveying nip portion formed by the conveying roller 5 and the pinch roller 6. At this time, the conveying roller 5 is in a stopped state. Even after the leading edge of the preceding sheet 1-A abuts against the conveying nip portion, the sheet feeding roller 3 is rotated by a predetermined amount so that the preceding sheet 1-A is aligned under a state in which the leading edge of the preceding sheet 1-A abuts against the conveying nip portion, thereby correcting skew feed. A skew feed correcting operation is also referred to as "registration operation".

Next, description is made with reference to FIG. 1C. After the completion of the skew feed correcting operation for the preceding sheet 1-A, the conveying motor 205 is driven to start rotating the conveying roller 5. The conveying roller 5 conveys the sheet at 15 inch/sec. After the preceding sheet 1-A undergoes head feeding to a position opposed to the recording head 7, the ink is ejected from the recording head 7 based on the recording data, thereby performing a recording operation.

The recording apparatus PR1 according to the first embodiment is a serial type recording apparatus including the recording head 7 mounted in the carriage 10. The recording apparatus PR1 performs a conveying operation for intermittently conveying the recording sheet 1 by a predetermined amount for each time by the conveying roller 5, and an image forming operation for causing the ink to be ejected from the recording head 7 with the movement of the carriage 10 in which the recording head 7 is mounted during a stopped state of the conveying roller 5. By repeating the two operations, the recording operation for the recording sheet 1 is performed.

When the preceding sheet 1-A undergoes head feeding, the sheet feeding motor 206 is switched to be driven at the low speed. Specifically, the pickup roller 2 and the sheet feeding roller 3 are rotated at 7.6 inch/sec. While the recording sheet 1 is intermittently conveyed by the predetermined amount for each time by the conveying roller 5, the sheet feeding roller 3 is also intermittently driven by the sheet feeding motor 206. Specifically, while the conveying roller 5 is being rotated, the sheet feeding roller 3 is also rotated. On the other hand, when the conveying roller 5 is in the stopped state, the sheet feeding roller 3 is also in a stopped state. A rotating speed of the sheet feeding roller 3 is lower than a rotating speed of the conveying roller 5. Therefore, the sheet is in a tensed state between the conveying roller 5 and the sheet feeding roller 3. The sheet feeding roller 3 is co-rotated by the recording sheet 1 that is conveyed by the conveying roller 5.

The drive shaft 19 is driven so as to intermittently drive the sheet feeding motor 206. A rotating speed of the pickup roller 2 is lower than the rotating speed of the conveying roller 5. Therefore, the pickup roller 2 is co-rotated by the recording sheet 1 that is conveyed by the conveying roller 5. Specifically, the pickup roller 2 is in a state of rotating ahead of the drive shaft 19. More specifically, the projection 19a of the drive shaft 19 is separated away from the first surface 2a to be held in abutment against the second surface 2b. Therefore, even after the trailing edge of the preceding sheet 1-A passes under the pickup roller 2, the second recording sheet 1 (subsequent sheet 1-B) is not picked up immediately. After the drive shaft 19 is driven for a predetermined time period, the projection 19a comes into abutment against the first surface 2a and the pickup roller 2 starts rotating.

Next, description is made with reference to FIG. 1D. FIG. 1D is an illustration of a state in which the pickup roller 2 starts rotating to pick up the subsequent sheet 1-B. The sheet detecting sensor 16 requires a predetermined interval or a larger interval between the sheets so as to detect an edge of the recording sheet 1 due to a factor such as sensor responsiveness. Specifically, a predetermined time interval is provided from the detection of the trailing edge of the preceding sheet 1-A by the sheet detecting sensor 16 to the detection of the leading edge of the subsequent sheet 1-B. Therefore, the preceding sheet 1-A and the subsequent sheet 1-B are required to be separated away from each other by a predetermined distance. Therefore, an angle θ of the recessed portion (FIG. 2A) of the pickup roller 2 is set to about 70 degrees.

Next, description is made with reference to FIG. 1E. The subsequent sheet 1-B that has been picked up by the pickup roller 2 is conveyed by the sheet feeding roller 3. At this time, the image forming operation is being performed on the preceding sheet 1-A by the recording head 7 based on the recording data. When the leading edge of the subsequent sheet 1-B is detected by the sheet detecting sensor 16, the sheet feeding motor 206 is switched to be driven at the high speed. Specifically, the pickup roller 2 and the sheet feeding roller 3 are rotated at 12 inch/sec.

Next, description is made with reference to FIG. 1F. The trailing end portion of the preceding sheet 1-A is pressed downward by the sheet presser lever 17. The subsequent sheet 1-B is moved at a higher speed than a speed at which the preceding sheet 1-A is moved to a downstream side through the recording operation performed by the recording head 7. Accordingly, a state in which a part of the leading end portion of the subsequent sheet 1-B is superposed on a part of the trailing end portion of the preceding sheet 1-A is achieved. The recording operation is performed on the preceding sheet 1-A based on the recording data. The preceding sheet 1-A is intermittently conveyed by the conveying roller 5. On the other hand, after the leading edge of the subsequent sheet 1-B is detected by the sheet detecting sensor 16, the sheet feeding roller 3 is continuously rotated at 12 inch/sec. As a result, the leading edge of the subsequent sheet 1-B catches up with the preceding sheet 1-A.

Next, description is made with reference to FIG. 1G. After achieving the overlapping state in which the leading end portion of the subsequent sheet 1-B is superposed on the trailing end portion of the preceding sheet 1-A, the subsequent sheet 1-B is conveyed by the sheet feeding roller 3 until the leading edge of the subsequent sheet 1-B is stopped at a predetermined position located upstream of the conveying nip portion. A position of the leading edge of the subsequent sheet 1-B is controlled based on the result of detection by the sheet detecting sensor 16. At this time, an image is formed on the preceding sheet 1-A by the recording head 7 based on the recording data.

Next, description is made with reference to FIG. 1H. While the conveying roller 5 is in the stopped state so as to perform the image forming operation (ink ejecting operation) for a final row on the preceding sheet 1-A, the sheet feeding roller 3 is driven. In this manner, the leading edge of the subsequent sheet 1-B is brought into abutment against the conveying nip portion so as to perform a skew feed correcting operation for the subsequent sheet 1-B.

Next, description is made with reference to FIG. 1I. After the image forming operation for the final row on the preceding sheet 1-A is terminated, the conveying roller 5 is rotated by a predetermined amount. Thereby, while a state in which the subsequent sheet 1-B is superposed on the preceding sheet 1-A is maintained, the subsequent sheet undergoes head feeding. The head feeding of the subsequent sheet 1-B is an operation of positioning the leading end portion of the subsequent sheet 1-B. The recording operation is performed on the subsequent sheet 1-B by the recording head 7 based on the recording data. When the subsequent sheet 1-B is intermittently conveyed for the recording operation, the preceding sheet 1-A is also intermittently conveyed. Then, the preceding sheet 1-A is delivered out of the recording apparatus PR1 by the delivery roller 9.

After the subsequent sheet 1-B undergoes head feeding, the sheet feeding motor 206 is switched to be driven at the low speed. Specifically, the pickup roller 2 and the sheet feeding roller 3 are rotated at 7.6 inch/sec. When there exists recording data after the subsequent sheet 1-B, the operation returns to the state illustrated in FIG. 1D, and the pickup operation for a third sheet is performed.

Figure 4:
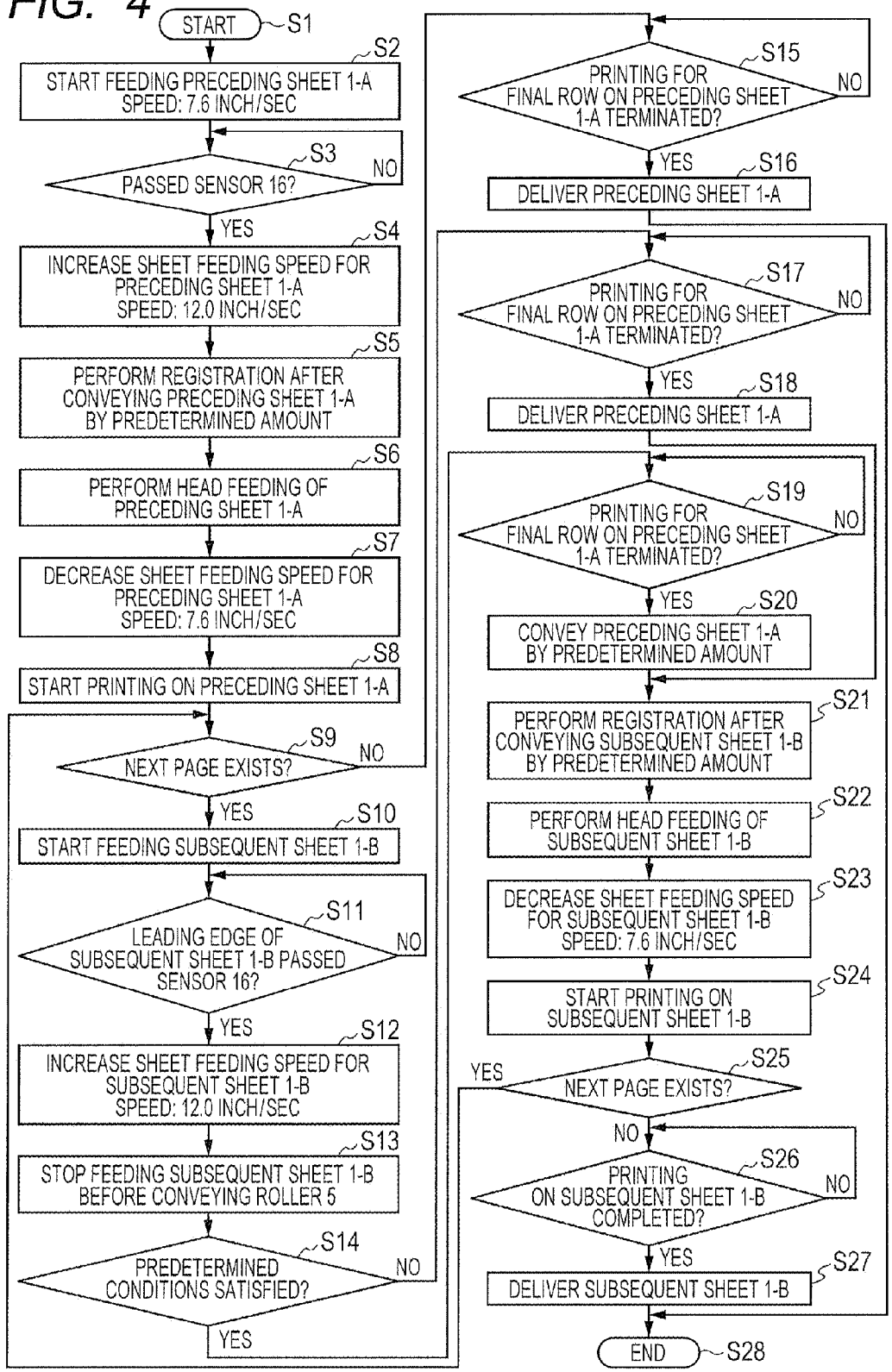
FIG. 4 is a flowchart for illustrating the overlapping sheet feeding operation according to a first embodiment of the present invention.

FIG. 4 is a flowchart for illustrating the overlapping sheet feeding operation according to the first embodiment.

A program corresponding to the processing of the flowchart illustrated in FIG. 4 is stored in the ROM 202 as an application for the overlapping sheet feeding operation. The MPU 201 executes the program on the RAM 203, thereby realizing an operation illustrated in FIG. 4.

The overlapping sheet feeding operation is an operation of conveying the sheets under a state in which a part of the preceding sheet 1-A and a part of the subsequent sheet 1-B overlap each other. The conveyance in the overlapping state can shorten conveyance time for all the sheets.

In Step S1, when the recording data is transmitted from the host computer 214 through intermediation of the I/F portion 213, the recording operation is started. In Step S2, the sheet feeding operation for the preceding sheet 1-A is started. Specifically, the sheet feeding motor 206 is driven at the low speed. The pickup roller 2 is rotated at 7.6 inch/sec. The preceding sheet 1-A is picked up by the pickup roller 2 and fed by the sheet feeding roller 3 toward the recording head 7.

In Step S3, the sheet detecting sensor 16 detects the leading edge of the preceding sheet 1-A. After the sheet detecting sensor 16 detects the leading edge of the preceding sheet 1-A, the sheet feeding motor 206 is switched to be driven at the high speed in Step S4. Specifically, the pickup roller 2 and the sheet feeding roller 3 are rotated at 12 inch/sec. After the sheet detecting sensor 16 detects the leading edge of the preceding sheet 1-A, the amount of rotation of the sheet feeding roller 3 is controlled. In this manner, in Step S5, the leading edge of the preceding sheet 1-A is brought into abutment against the conveying nip portion so as to perform the skew feed correcting operation for the preceding sheet 1-A.

In Step S6, the preceding sheet 1-A undergoes head feeding based on the recording data. In Step S7, the sheet feeding motor 206 is switched to be driven at the low speed. In Step S8, the recording head 7 ejects ink onto the preceding sheet 1-A to start the recording operation. Specifically, the conveying operation for intermittently conveying the preceding sheet 1-A by the conveying roller 5, and the image forming operation (ink ejecting operation) for ejecting the ink from the recording head 7 with the movement of the carriage 10 are repeated. In this manner, the recording operation is performed on the preceding sheet 1-A. In synchronization with the operation of intermittently conveying the preceding sheet 1-A by the conveying roller 5, the sheet feeding motor 206 is intermittently driven at the low speed. Specifically, the pickup roller 2 and the sheet feeding roller 3 are intermittently rotated at 7.6 inch/sec.

In Step S9, it is determined whether or not recording data for a next page exists. When it is determined that the recording data for the next page does not exist, it is determined in Step S15 that whether or not the recording operation on the preceding sheet 1-A has been completed. When it is determined that the recording operation has been completed, the preceding sheet 1-A is delivered in Step S16, and the recording operation is terminated.

When the recording data for the next page exists, the operation of feeding the preceding sheet 1-B is started in Step S10. Specifically, the subsequent sheet 1-B is picked up by the pickup roller 2 and fed by the sheet feeding roller 3 toward the recording head 7. The pickup roller 2 is rotated at 7.6 inch/sec. The recessed portion of the pickup roller 2 is formed so as to be larger than the projection 19a of the drive shaft 19. Therefore, a predetermined interval is provided between the trailing edge of the preceding sheet 1-A and the leading edge of the subsequent sheet 1-B.

After the sheet detecting sensor 16 detects the leading edge of the subsequent sheet 1-B in Step S11, the sheet feeding motor 206 is switched to be driven at the high speed in Step S12. Specifically, the pickup roller 2 and the sheet feeding roller 3 are rotated at 12 inch/sec. After the sheet detecting sensor 16 detects the leading edge of the subsequent sheet 1-B, the amount of rotation of the sheet feeding roller 3 is controlled. Thereby, in Step S13, the subsequent sheet 1-B is conveyed so that the leading edge of the subsequent sheet 1-B reaches a position on upstream of the conveying nip portion by a predetermined amount. The preceding sheet 1-A is intermittently conveyed based on the recording data. By continuously driving the sheet feeding motor 206 at the high speed, a state in which the leading end portion of the subsequent sheet 1-B is superposed on the trailing end portion of the preceding sheet 1-A, that is, an overlapping state is achieved.

In Step S14, it is determined whether or not predetermined conditions are satisfied. The "predetermined conditions" are conditions under which the subsequent sheet 1-B can be superposed on a part of the preceding sheet 1-A in the flowchart illustrated in FIG. 6. Specifically, the predetermined conditions are conditions starting from the determination result "Yes" in Step S502 and finally obtaining the determination result "Yes" in Step S511 in the flowchart illustrated in FIG. 6. When the predetermined conditions are satisfied, execution of abutment control during scanning is determined. Specifically, the subsequent sheet 1-B can be superposed on the part of the preceding sheet 1-A.

When the predetermined conditions are satisfied, it is determined in Step S19 whether or not the printing operation for the final row on the preceding sheet 1-A has been terminated. When it is determined that the printing operation has been terminated, the preceding sheet 1-A is conveyed by a predetermined amount in Step S20. In this step, the preceding sheet 1-A is conveyed so as to achieve an overlapping amount calculated in a process described below. After that, in Step S21, the leading edge of the subsequent sheet 1-B is brought into abutment against the conveying nip portion so as to perform the skew feed correcting operation (registration operation) for the subsequent sheet 1-B. Then, in Step S22, the subsequent sheet 1-B undergoes head feeding while maintaining the overlapping state. Specifically, the subsequent sheet 1-B is positioned.

When it is determined in Step S14 that the predetermined conditions are not satisfied, the overlapping state is cancelled, and the subsequent sheet 1-B undergoes head feeding. Specifically, when it is determined in Step S17 that the printing operation for the final row on the preceding sheet 1-A is terminated, a delivery operation for the preceding sheet 1-A is performed in Step S18. During the delivery operation, the sheet feeding motor 206 is not driven, and hence the leading edge of the subsequent sheet 1-B is stopped at the position on upstream of the conveying nip portion by the predetermined amount. The preceding sheet 1-A is delivered, and thus the overlapping state is cancelled. In Step S21, the leading edge of the subsequent sheet 1-B is brought into abutment against the conveying nip portion so as to perform the skew feed correcting operation for the subsequent sheet 1-B. Then, in Step S22, the subsequent sheet 1-B undergoes head feeding. Specifically, the subsequent sheet 1-B is positioned.

In Step S23, the sheet feeding motor 206 is switched to be driven at the low speed. In Step S24, the ink is ejected from the recording head 7 onto the subsequent sheet 1-B so as to start the recording operation. Specifically, the conveying operation for intermittently conveying the subsequent sheet 1-B by the conveying roller 5 and the image forming operation (ink ejecting operation) for ejecting the ink from the recording head 7 with the movement of the carriage 10 are repeated. In this manner, the recording operation is performed on the subsequent sheet 1-B. In synchronization with the operation of intermittently conveying the subsequent sheet 1-B by the conveying roller 5, the sheet feeding motor 206 is intermittently driven at the low speed. Specifically, the pickup roller 2 and the sheet feeding roller 3 are intermittently rotated at 7.6 inch/sec.

In Step S25, it is determined whether or not the recording data for a next page exists. When it is determined that the recording data for the next page exists, the process returns to Step S9. When it is determined that the recording data for the next page does not exist, it is then determined in Step S26 whether or not the printing on the subsequent sheet 1-B has been completed. When it is determined that the printing on the subsequent sheet 1-B has been completed, the delivery operation for the subsequent sheet 1-B is performed in Step S27. Then, in Step S28, the recording operation is terminated.

Figures 1, 5A:
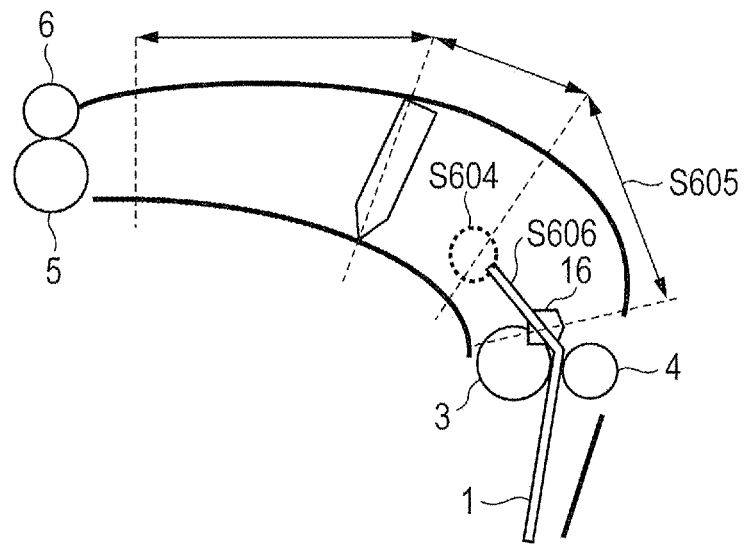
FIGS. 5A-1 and 5A-2 are views for illustrating an operation for superposing a subsequent sheet on a preceding sheet according to the first embodiment.
Figures 2, 5A:
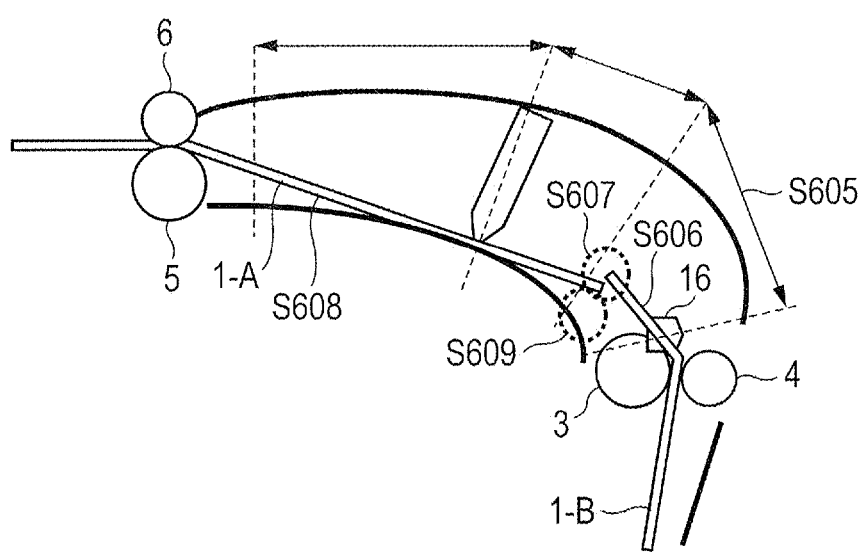

FIG. 5A-1 and FIG. 5A-2 are views for illustrating an operation of superposing the subsequent sheet on the preceding sheet according to the first embodiment. FIG. 5A-1 and FIG. 5A-2 are enlarged views for illustrating a portion between the sheet feeding roller nip portion, which is formed by the sheet feeding roller 3 and the driven sheet feeding roller 4, and the conveying roller nip portion, which is formed by the conveying roller 5 and the pinch roller 6.

The operations performed in Step S12 and Step S13 of FIG. 4, specifically, the operation of achieving the overlapping state in which the leading end portion of the subsequent sheet is superposed on the trailing end portion of the preceding sheet is described.

A process in which the recording sheet 1 is conveyed by the conveying roller 5 and the sheet feeding roller 3 is sequentially described as three states. A first state (operation in which the subsequent sheet follows the preceding sheet) is described with reference to FIG. 5A-1 and FIG. 5A-2. A second state (operation in which the subsequent sheet is superposed on the preceding sheet) is described with reference to FIG. 5B-1 and FIG. 5B-2. A third state (operation performed until a determination on whether or not to stop the conveying operation for the subsequent sheet and continue the overlapping state, that is, a determination on abutment) is described with reference to FIG. 5C. The "abutment" means bringing the subsequent sheet 1-B into abutment against the conveying roller 5. By the abutment of the subsequent sheet 1-B while the preceding sheet 1-A is present at the conveying roller 5, the leading end portion of the subsequent sheet 1-B can be superposed on the part of the preceding sheet 1-A.

As illustrated in FIG. 5A-1, the sheet feeding roller 3 is controlled to convey the subsequent sheet 1-B. Then, the sheet detecting sensor 16 detects the recording sheet 1. In a section S605 which extends from a detecting position of the sheet detecting sensor 16 to a start position S604 at which the subsequent sheet 1-B can be superposed on the preceding sheet 1-A, the subsequent sheet 1-B is fed to follow the preceding sheet 1-A. The start position S604 at which the subsequent sheet 1-B can be superposed on the preceding sheet 1-A is determined by a configuration of a mechanism.

In the first state, there may be a case of stopping the sheet following operation in the section S605. As illustrated in FIG. 5A-2, when a leading edge S607 of the subsequent sheet 1-B passes over a trailing edge S609 of the preceding sheet 1-A, the operation of superposing the subsequent sheet on the preceding sheet is not performed.

Figures 1, 5B:
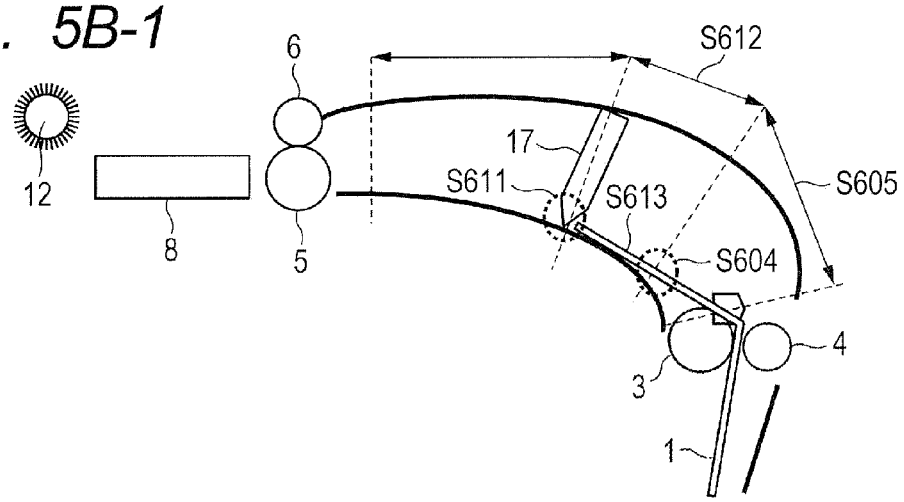
Figures 2, 5B:
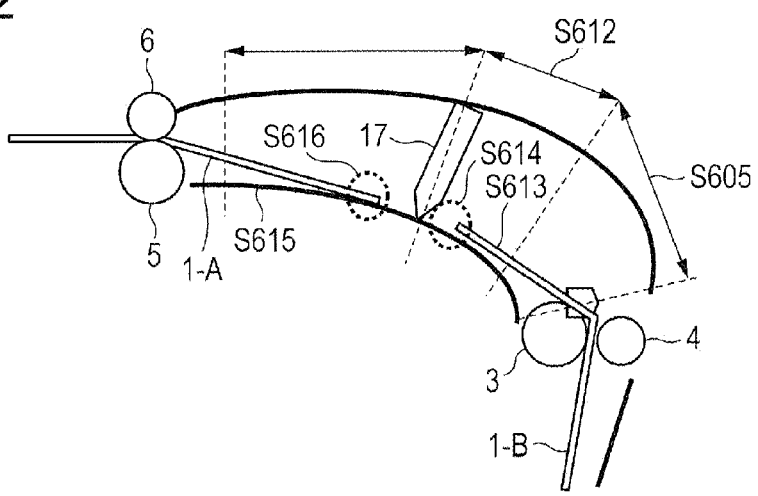

In FIG. 5B-1, in a section S612 from the start position S604 at which the subsequent sheet 1-B can be superposed on the preceding sheet 1-A to an end position S611 at which the recording sheet 1 can be pressed and held by the sheet presser lever 17, the subsequent sheet 1-B is superposed on the preceding sheet 1-A.

In the second state, in the section S612, there may be a case of stopping the operation of superposing the subsequent sheet 1-B on the preceding sheet 1-A. As illustrated in FIG. 5B-2, when a leading edge S614 of the subsequent sheet 1-B cannot catch up with a trailing edge S616 of the preceding sheet 1-A, the subsequent sheet 1-B is not conveyed to the position at which it is determined whether or not to continue the overlapping state.

Figure 5C:
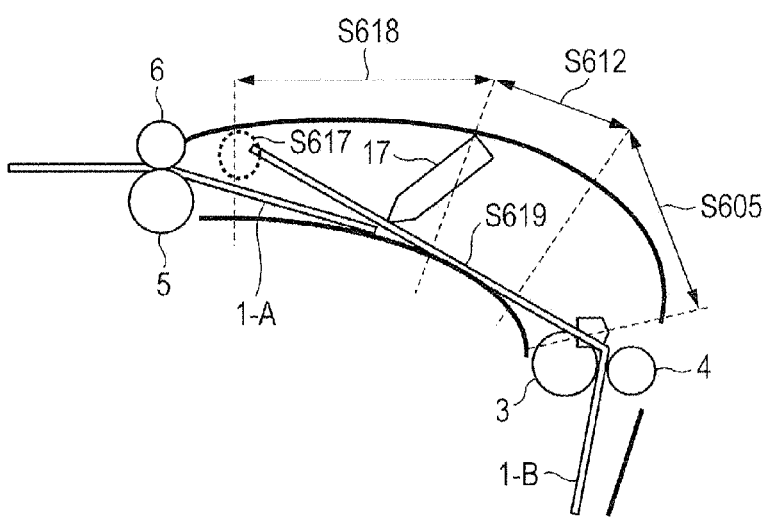

In FIG. 5C, the subsequent sheet 1-B is conveyed to a section S618 which extends from the end position S611 to a determination position at which it is determined whether or not to continue the overlapping state. Specifically, the process proceeds to control for determining whether the overlapping state between the preceding sheet 1-A and the subsequent sheet 1-B is continued or canceled (abutment determination corresponding to determination on whether or not to bring the subsequent sheet 1-B into abutment against the conveying roller 5).

FIG. 6 is a flowchart for illustrating a head feeding operation of the subsequent sheet 1-B according to the first embodiment. The determination on whether or not the predetermined conditions are satisfied, which has been described in relation to Step S14 of FIG. 4, is described in detail. A program corresponding to the process illustrated in the flowchart of FIG. 6 is stored in the ROM 202 as an application for the overlapping sheet feeding operation. The MPU 201 executes the program on the RAM 203, thereby realizing the operation illustrated in FIG. 6.

The determination on whether or not to continue the overlapping state between the preceding sheet 1-A and the subsequent sheet 1-B (abutment determination corresponding to the determination on whether or not to bring the subsequent sheet 1-B into abutment against the conveying roller 5) is described. The abutment determination is started in Step S501. First, in Step S502, it is determined whether or not the subsequent sheet 1-B has reached the determination position S617. When the subsequent sheet 1-B has not reached the determination position S617, the subsequent sheet 1-B cannot be superposed on the preceding sheet 1-A. Therefore, the execution of the abutment control without overlapping the sheets is determined in Step S503. Then, in Step S504, the determination process is terminated. When it is determined in Step S502 that the subsequent sheet 1-B has reached the determination position, it is then determined in Step S505 whether or not the preceding sheet 1-A has passed over the conveying roller 5. When it is determined in Step S505 that the preceding sheet 1-A has passed over the conveying roller 5, it is determined in Step S506 to execute the abutment control without overlapping the sheets. The abutment control during scanning is control for performing the skew feed correcting operation and the head feeding for the subsequent sheet 1-B while maintaining the overlapping state.

When the preceding sheet 1-A has not passed over the conveying roller 5, it is determined in Step S507 whether or not the preceding sheet 1-A reaches the pressing spur 12 immediately before printing. When the preceding sheet 1-A does not reach the pressing spur 12, it is determined in Step S508 that the abutment control is executed after the overlapping state is cancelled.

When the preceding sheet 1-A reaches the pressing spur 12 immediately before the printing, it is then determined in Step S509 whether or not the overlapping amount is smaller than a reference. The "overlapping amount" is the amount by which the trailing end of the preceding sheet 1-A and the leading end of the subsequent sheet 1-B overlap each other. Further, it is determined whether or not the overlapping amount is smaller than a preset threshold value. When the overlapping amount is smaller than the threshold value, it is determined in Step S510 that the abutment control is executed after the overlapping state is cancelled.

When the overlapping amount is equal to or larger than the threshold value, it is then determined in Step S511 whether or not there is a clearance between the final row (specifically, a currently printed row) and a preceding row. When the printing is performed without the clearance determined in Step S511, an impact is applied to the preceding sheet 1-A due to the abutment to cause print distortion between the final row and the preceding row. Therefore, when it is determined in Step S511 that there is no clearance, in order to prevent the print distortion, it is determined in Step S512 that the abutment control is executed after the overlapping state is cancelled. Specifically, after the overlapping state is cancelled, the leading edge of the subsequent sheet 1-B is brought into abutment against the roller. When there is a clearance, the print distortion does not occur even when the impact is applied to the preceding sheet 1-A due to the abutment. Thus, when it is determined that a clearance is present, the skew feed correcting operation and the head feeding operation of the subsequent sheet 1-B are performed while the overlapping state is maintained.

As described above, the determination on whether to continue or cancel the overlapping state between the preceding sheet 1-A and the subsequent sheet 1-B, that is, the abutment determination is made.

Figure 8:
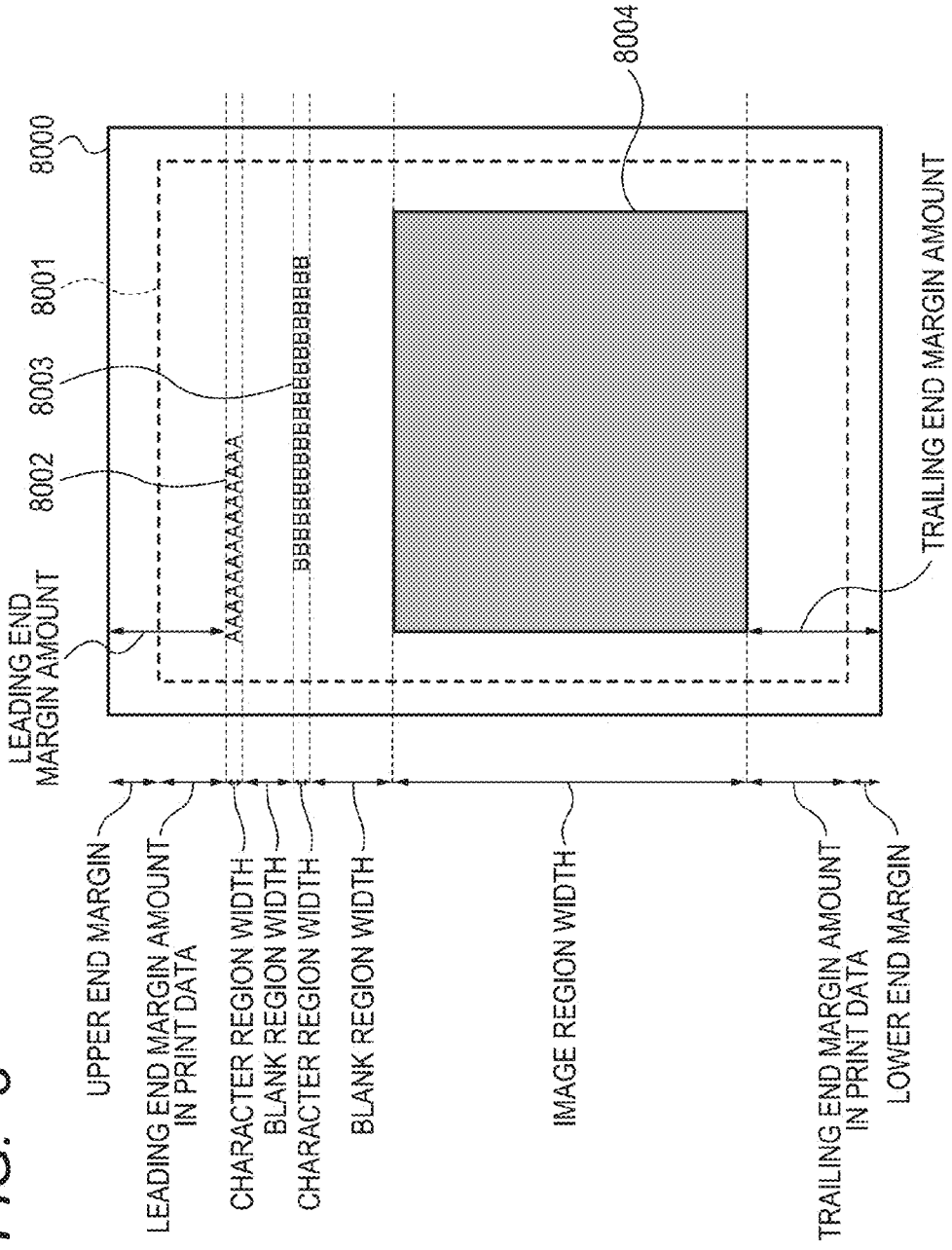
FIG. 8 is a view for illustrating an example of print data and an output sheet.

FIG. 8 is a view for illustrating an example of print data and an output sheet. The recording apparatus PR1 allocates print data 8001, which is received from the host computer 214, on a printable region in an output sheet 8000 and outputs a print result as illustrated in FIG. 8.

The recording apparatus PR1 according to the first embodiment determines the overlapping amount based on a trailing end margin amount in an image on the preceding sheet 1-A and a leading end margin amount of the subsequent sheet 1-B, as illustrated in FIG. 8, and conveys the preceding sheet 1-A and the subsequent sheet 1-B in the overlapping state. When the print data contains attribute information indicating that the print data is character data, image data, or the like for each pixel or each line, the print data can be divided into a character region and an image region, as illustrated in FIG. 8. Further, when the print data contains attribute information indicating that the print data is color data, black data, or the like for each pixel or each line, the print data can be divided into a color region and a black region. Specifically, the recording apparatus PR1 detects at least one of the character region, the image region, the color region, and the black region in the image. In FIG. 8, a first character region 8002, a second character region 8003, and an image region 8004 are illustrated.

FIG. 7 is a flowchart for illustrating an operation of calculating the leading end margin amount of the subsequent sheet 1-B according to the first embodiment. A program corresponding to the process of the flowchart illustrated in FIG. 7 is stored in the ROM 202 as an application for the overlapping sheet feeding operation. The MPU 201 executes the program on the RAM 203, thereby realizing the operation illustrated in FIG. 7.

After the calculation of the leading end margin amount is started in Step S401, a printable region is read based on information of a sheet size. An uppermost printable position and an upper end margin are specified. Therefore, in Step S403, the upper end margin for the printable region is set as the leading end margin amount.

Next, in Step S404, the first print data is read. Next, in Step 405, the print data is analyzed to calculate a leading end margin amount in the first print data. This calculated leading end margin amount in the first print data is added to the leading end margin amount. With the operation described above, the leading end margin amount is determined.

The preceding sheet 1-A and the subsequent sheet 1-B are conveyed in a state in which the preceding sheet 1-A and the subsequent sheet 1-B overlap each other by an amount determined based on the leading end margin amount so that an image recording region of the preceding sheet 1-A and an image recording region of the subsequent sheet 1-B do not overlap each other.

On an upper sheet of overlapping sheets, in a peripheral region located between a region under which a lower sheet is present and a region under which the lower sheet is not present, a distance between an upper sheet surface and the head varies in a stepwise manner. Therefore, when the image is recorded on the peripheral region, an ink impact position is misregistered. Such misregistration causes a problem of distortion in an image.

FIG. 9A and FIG. 9B are views for illustrating cross sections of the preceding sheet 1-A and the subsequent sheet 1-B which overlap each other. FIG. 9A is a view for illustrating the cross sections of the preceding sheet 1-A and the subsequent sheet 1-B which overlap each other by an overlapping amount D.

When there is an overlapping portion in which the subsequent sheet 1-B is superposed on the preceding sheet 1-A, a distance between the subsequent sheet 1-B and the head varies in a stepwise manner over a warped portion W1a and an inclined portion W2a. The warped portion W1a is a region of the overlapping portion, below which the preceding sheet 1-A is present, and the subsequent sheet 1-B is warped in this region. The inclined portion W2a is a region of a non-overlapping portion in which the subsequent sheet 1-B is not superposed on the preceding sheet 1-A, this region is located between a boundary and a region in which the subsequent sheet 1-B is held in contact with the platen plate. The boundary is between the overlapping portion and the non-overlapping portion, and therefore is also between the warped portion W1a and the inclined portion W2a. The overlapping portion is consist of a combination of the overlapping amount D and the warped portion W1a.

The region (the warped portion W1a+the inclined portion W2a) over which the distance between the subsequent sheet 1-B and the recording head varies in a stepwise manner is referred to as "stepwise region". Over the region under which the preceding sheet 1-A is present, in a region excluding the warped parts W1a, the distance between the subsequent sheet 1-B and the head is shorter than that over the region under which the preceding sheet 1-A is not present. However, the distance between the subsequent sheet 1-B and the head does not vary over the region excluding the warped parts W1a. Therefore, by adjusting ink ejection timing, the ink impact position can be easily corrected in the region excluding the warped portion W1a over the region under which the preceding sheet 1-A is present. Over the stepwise region (W1a+W2a), however, the distance between the subsequent sheet 1-B and the head varies. Therefore, it is difficult to correct the ink impact position by adjusting the ink ejection timing. Thus, there is a problem in that the image recorded on the stepwise region (W1a+W2a) is distorted.

FIG. 9B is a view for illustrating cross sections of the sheets when sheets of a kind different from that used in FIG. 9A is used. The kind of sheets illustrated in FIG. 9B is hardly warped as compared with the kind of sheets illustrated in FIG. 9A. Therefore, with the same overlapping amount D, a size of the stepwise region (W1b+W2b) becomes larger for the kind of sheets illustrated in FIG. 9B. A dimension of the stepwise region may change depending on a difference in inflexibility of the sheets.

Therefore, in the first embodiment, the overlapping amount D is controlled so that printing is not performed on a region having a predetermined width from the boundary between the overlapping portion in which the subsequent sheet 1-B and the preceding sheet 1-A overlap each other and the non-overlapping portion in which the subsequent sheet 1-B and the preceding sheet 1-A do not overlap each other.

A process of determining the overlapping amount based on the trailing end margin amount of the preceding sheet 1-A and the leading end margin amount of the subsequent sheet 1-B in the first embodiment is described with reference to FIG. 10, FIG. 11A, FIG. 11B, FIG. 12A, and FIG. 12B.

Figure 10:
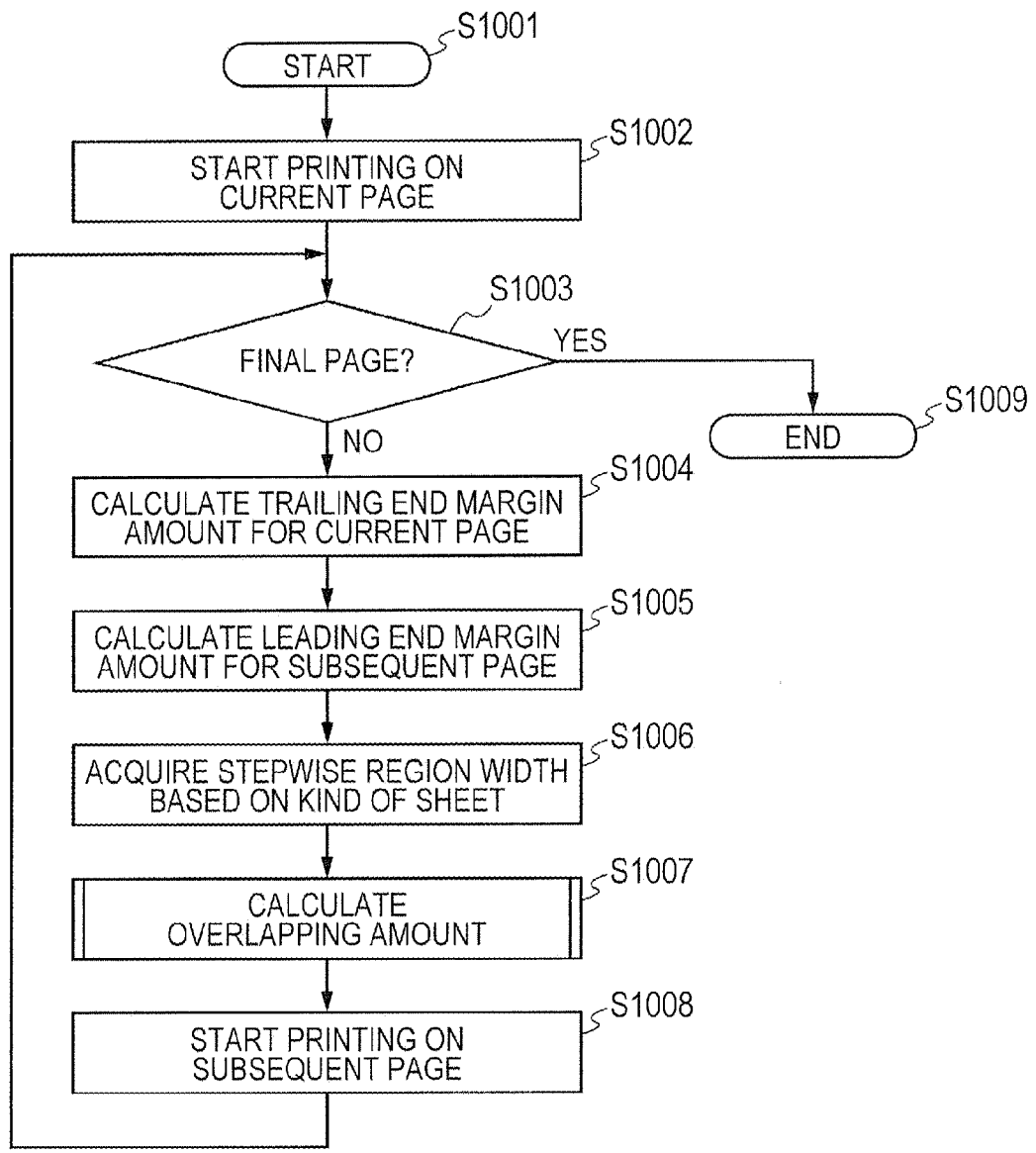
FIG. 10 is a flowchart for illustrating a process performed by an image recording apparatus according to the first embodiment.

FIG. 10 is a flowchart for illustrating a process performed by the recording apparatus PR1 according to the first embodiment. A program corresponding to the process of the flowchart illustrated in FIG. 10 is stored in the ROM 202 as an application for the overlapping sheet feeding operation. The MPU 201 executes the program on the RAM 203, thereby realizing the operation illustrated in FIG. 10.

In Step S1001, when recording data is transmitted from the host computer 214 through intermediation of the I/F portion 213, the recording operation is started. In Step S1002, printing of a current page is started.

In Step S1003, it is determined whether or not the current page is a final page. When it is determined that the current page is the final page, and the printing on the current page is terminated, the recording operation is terminated in Step S1009. When it is determined that the current page is not the final page, the overlapping amount is calculated in Step S1004 and subsequent steps.

In Step S1004, a trailing end margin amount Mb of the current page is calculated. When the trailing end margin amount Mb of the current page is calculated, the trailing end margin amount Mb may be calculated, for example, through comparison of raster data received from the host computer with a white pixel value. When a document is in a PDL format or the like, the trailing end margin amount Mb may be determined based on a result of analysis of the PDL format. When a document is in a JPEG format, the trailing end margin amount Mb may be determined by analyzing at the time of decoding. In a case of copy, the trailing end margin amount Mb may be determined by analyzing a scanned image. The first embodiment does not relate to a technology of detecting the margin amount. Therefore, any known margin detecting technology may be used in this step.

In Step S1005, a leading end margin amount Mt of a subsequent page is calculated. The leading end margin amount Mt may be calculated in the same manner as the calculation of the trailing end margin amount Mb in Step S1004. The calculation of the leading end margin amount Mt of the subsequent page and the calculation of the trailing end margin amount Mb of the current page are different only in positions to be calculated, that is, the position to be calculated is the leading end or the trailing end.

Next, in Step S1006, a stepwise region width (W1+W2) is acquired based on the kind of sheet. In the first embodiment, there is described a case where there is one kind of sheet. The stepwise region width (W1+W2) varies depending on characteristics of the sheet. Therefore, for application to a plurality of kinds of sheets, the stepwise region width needs to be changed depending on a kind of sheet.

For example, it may be to measure the stepwise region width in advance, hold a table having the kind of sheet as a key, and refer to a table value at the time of calculation of the overlapping amount, for each of the plurality of kinds of sheets. When the stepwise region width (W1+W2) is zero as a result of measurement, the overlapping amount is the same as that obtained in a case where the first embodiment is not applied, as illustrated in the flowchart for the calculation of the overlapping amount. The stepwise region width (W1+W2) becomes zero under a state in which the subsequent sheet 1-B superposed on the preceding sheet 1-A is not warped and is held in contact with the platen plate on an upstream side adjacent to the boundary. Specifically, the stepwise region width (W1+W2) becomes zero under a state in which the subsequent sheet 1-B is held in contact with the preceding sheet 1-A, and the portion of the subsequent sheet 1-B, under which the preceding sheet 1-A is not present, is held in contact with the platen plate.

The stepwise region width of a specific kind of sheet may be set to zero regardless of the result of measurement so as to switch between application and non-application of the first embodiment for each kind of sheet.

Next, the overlapping amount D is calculated in Step S1007.

Figure 11A:
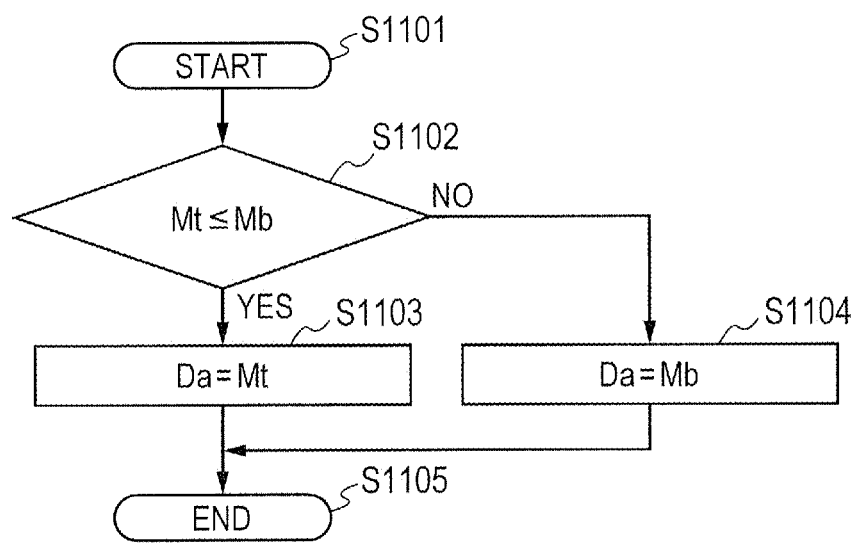
FIGS. 11A and 11B are flowcharts for illustrating an operation of calculating an overlapping amount according to the first embodiment.
Figure 11B:
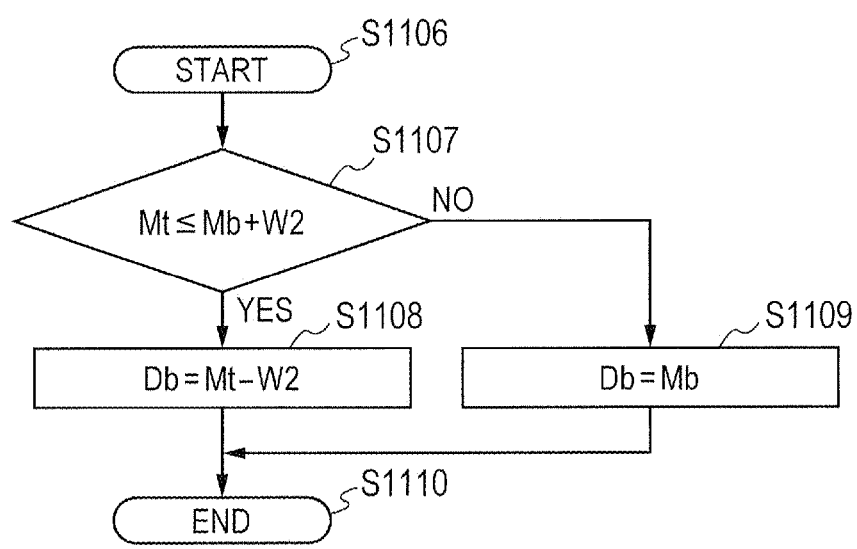

FIG. 11A and FIG. 11B are flowcharts for illustrating an operation of calculating the overlapping amount D in relation to the first embodiment. FIG. 11A is a flowchart for illustrating an operation of calculating the overlapping amount D without applying the first embodiment, whereas FIG. 11B is a flowchart for illustrating an operation of calculating the overlapping amount D with the first embodiment. Programs corresponding to the flowcharts illustrated in FIG. 11A and FIG. 11B are stored in the ROM 202 as applications for the overlapping sheet feeding operation. The MPU 201 executes the programs on the RAM 203, thereby realizing the operations illustrated in FIG. 11A and FIG. 11B.

An overlapping amount Da is indicated in the flowchart illustrated in FIG. 11A, whereas an overlapping amount Db is indicated in the flowchart illustrated in FIG. 11B. In Step S1102, the leading end margin amount Mt and the trailing end margin amount Mb in the image are compared with each other. When the leading end margin amount Mt is smaller than the trailing end margin amount Mb, the smaller leading end margin amount Mt is set as the overlapping amount Da in Step S1103. When the trailing end margin amount Mb is smaller than the leading end margin amount Mt, the smaller trailing end margin amount Mb is set as the overlapping amount Da in Step S1104.

In the flowchart of FIG. 11B, the leading end margin amount Mt and a value obtained by adding the width W2 of the inclined portion (rear end of the stepwise region) to the trailing end margin amount Mb are compared with each other in Step S1107. When the leading end margin amount Mt is smaller than the value obtained by adding the width W2 of the inclined portion (rear end of the stepwise region) to the trailing end margin amount Mb, a value obtained by subtracting the width W2 of the inclined portion from the leading end margin amount Mt is set as the overlapping amount Db in Step S1108. The reason for performing such setting described above is to prevent the following adverse effect. Specifically, when the overlapping amount Db is set larger than the value obtained by subtracting the width W2 of the inclined portion from the smaller leading end margin amount Mt, the recording region of the subsequent sheet 1-B is contained in the stepwise region (W1+W2), and hence the recording is performed on the stepwise region. As a result, the printed image is adversely distorted. On the other hand, when the value obtained by adding the width W2 of the inclined portion (rear end of the stepwise region) to the trailing end margin amount Mb is smaller than the leading end margin amount Mt, the trailing end margin amount Mb is set as the overlapping amount Db in Step S1109. The reason for performing such setting described above is to avoid the following adverse effect. Specifically, when the overlapping amount Db is set larger than the smaller trailing end margin amount Mb, the leading end of the subsequent sheet 1-B covers the recording region of the preceding sheet so that the data to be recorded on the preceding sheet 1-A is adversely recorded on the leading end of the subsequent sheet 1-B.

Returning to FIG. 10, a conveying amount of the preceding sheet 1-A is determined based on the overlapping amount calculated in Step S1007. In Step S1008, printing is performed on the subsequent page. Thereafter, in Step S1003, it is determined whether or not the final page.

Figure 12A:
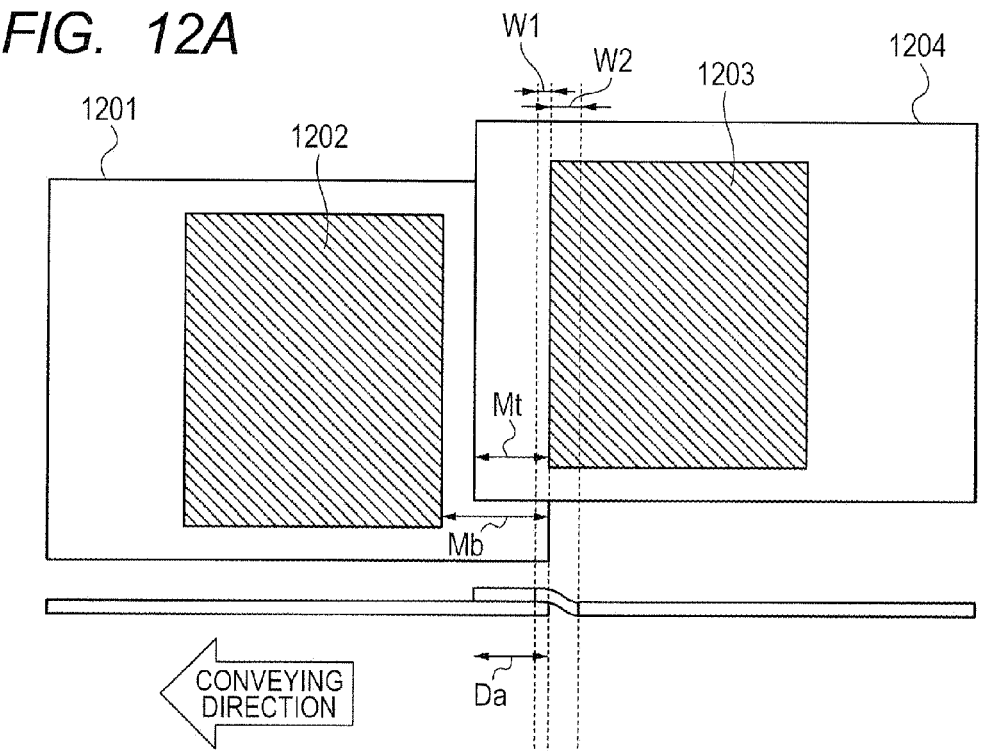
FIGS. 12A and 12B are views for illustrating the concept of an overlapping state according to the first embodiment.
Figure 12B:
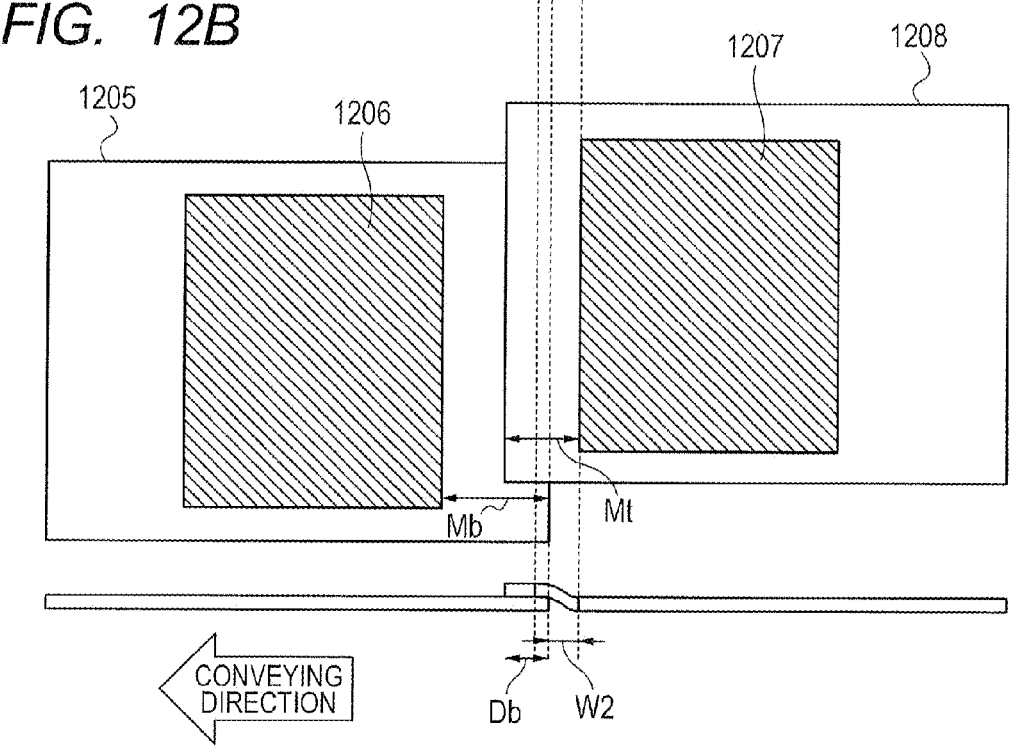

FIG. 12A and FIG. 12B are views, each for illustrating the concept of the overlapping state according to the first embodiment. The overlapping states illustrated in FIG. 12A and FIG. 12B correspond to the flowcharts of FIG. 11A and FIG. 11B, respectively for calculating the overlapping amount Da and the overlapping amount Db.

In regions 1202, 1203, 1206, and 1207, a recorded image or a recorded character image is present. As illustrated in FIG. 12A, in an overlapping amount calculating process without the first embodiment, the printing is performed on the inclined portion W2 of the stepwise region. On the other hand, with the first embodiment, as illustrated in FIG. 12B, the overlapping amount for the amount of the inclined portion W2 of the stepwise region is subtracted. Therefore, the printing is not performed on the stepwise region. Further, by switching the stepwise region width depending on a kind of sheet, an appropriate overlapping amount can be calculated in accordance with a kind of sheet to be used.

As described above, according to the first embodiment, the plurality of recording sheets are conveyed to the recording unit in the overlapping state. On the subsequent sheet 1-B, in the vicinity of the boundary between the region under which the preceding sheet 1-A is present and the region under which the preceding sheet 1-A is not present, the printed image is not distorted.

Second Embodiment

In the first embodiment, the overlapping amount is determined based on the trailing end margin amount Mb of the preceding sheet 1-A and the leading end margin amount Mt of the subsequent sheet 1-B. Thereby, the overlapping amount is calculated so as not to record the image on the stepwise region. In a second embodiment of the present invention, the image is recorded on a region of the overlapping region excluding the stepwise region. Therefore, in the second embodiment, the overlapping amount is determined based on the trailing end margin amount of the preceding sheet 1-A, the leading end margin amount Mt of the subsequent sheet 1-B, and an in-page blank region of the subsequent sheet 1-B.

In the second embodiment, the schematic configuration of the recording apparatus and the overlapping sheet feeding operation performed by the recording apparatus are the same as those of the first embodiment, and therefore the description thereof is herein omitted.

An operation of the image recording apparatus according to the second embodiment is now described.

Figure 13:
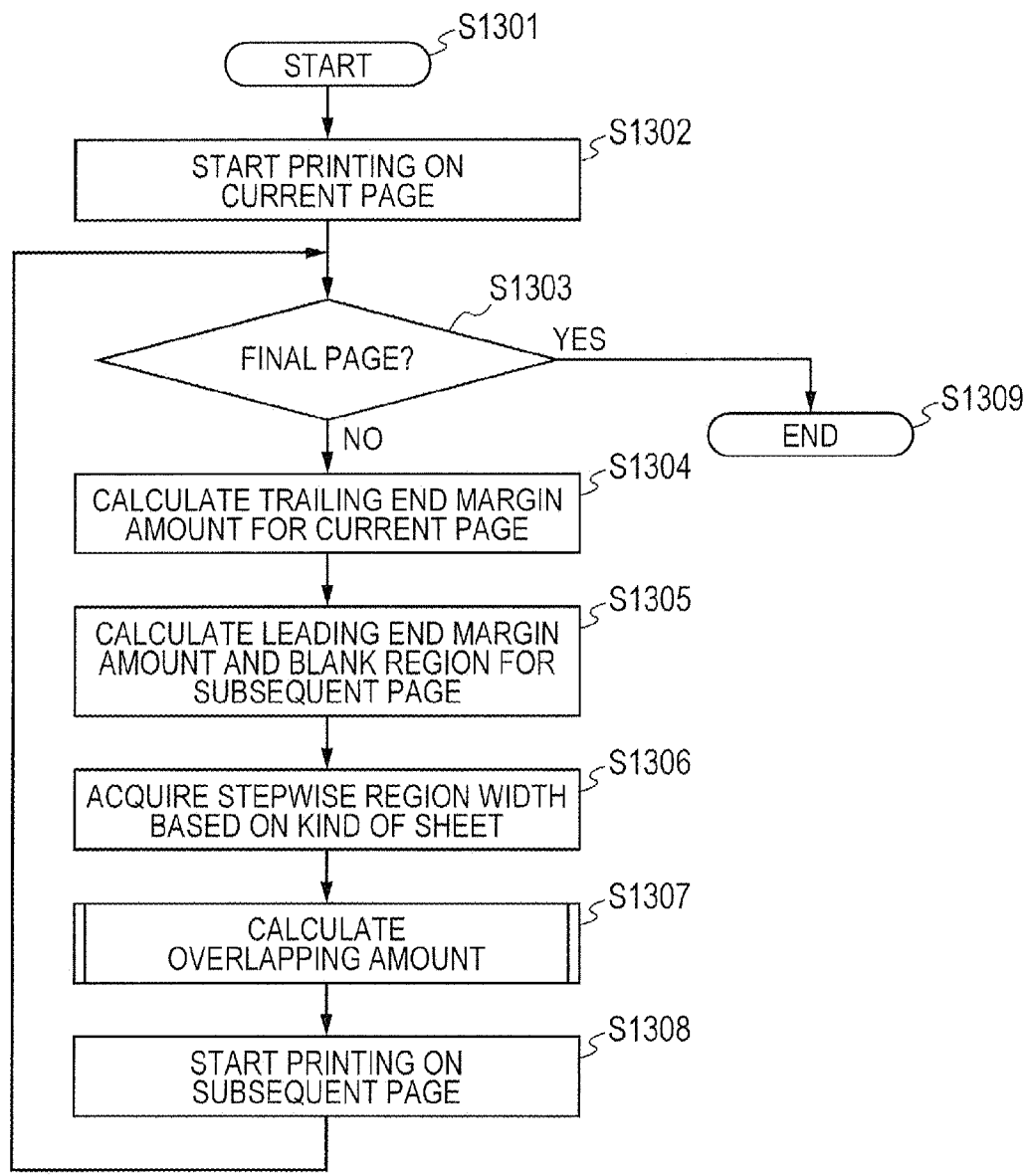
FIG. 13 is a flowchart for illustrating an operation of an image recording apparatus according to a second embodiment of the present invention.
Figure 14A:
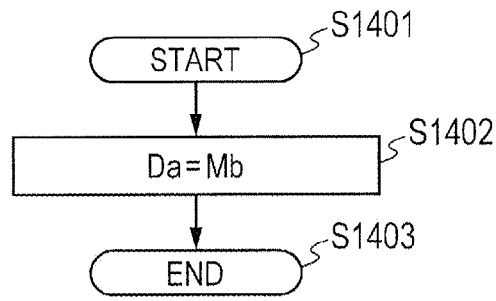
FIGS. 14A and 14B are flowcharts for illustrating an operation of calculating an overlapping amount according to the second embodiment.
Figure 14B:
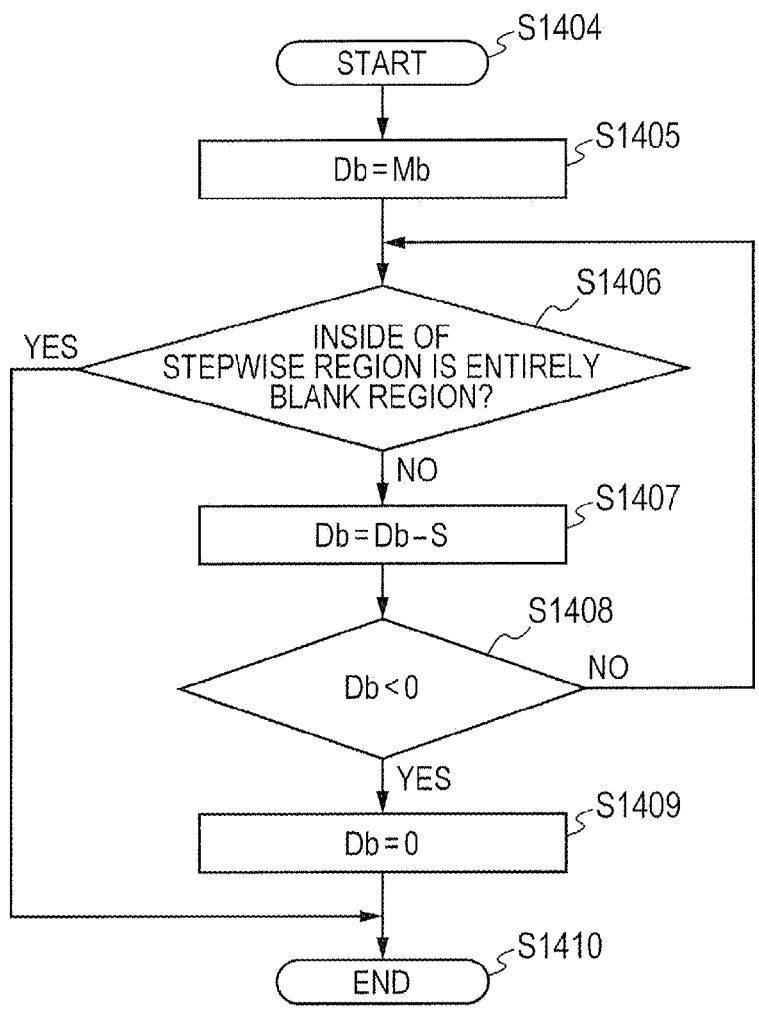

FIG. 13 is a flowchart for illustrating an operation of the image recording apparatus according to the second embodiment. FIG. 14A and FIG. 14B are flowcharts for illustrating an operation of calculating an overlapping amount according to the second embodiment. Programs corresponding to the processes of the flowcharts illustrated in FIG. 13, FIG. 14A, and FIG. 14B are stored in the ROM 202 as applications for the overlapping sheet feeding operation. The MPU 201 executes the programs on the RAM 203, thereby realizing the operations illustrated in FIG. 13, FIG. 14A, and FIG. 14B.

Step S1301 to Step S1304 are the same as Step S1001 to Step S1004 illustrated in FIG. 10. In Step S1305, the leading end margin amount Mt and a blank region Mn of the subsequent page are calculated (detected). Here, the "n" is a number indicating the blank region in the page. A method of calculating the leading end margin amount Mt is the same as that of the calculation in Step S1304 except that an object to be calculated is the leading end. Further, a method of calculating the blank region (blank region detecting method) is the same as that used in the calculation in Step S1304 except that an object to be calculated is a print data region in a page. Concurrently with the calculation of the blank region, a print region An that is not the blank region is calculated. Here, "n" is a number indicating the print region in the page. One blank region is present for one print region as a set.

Figure 15A:
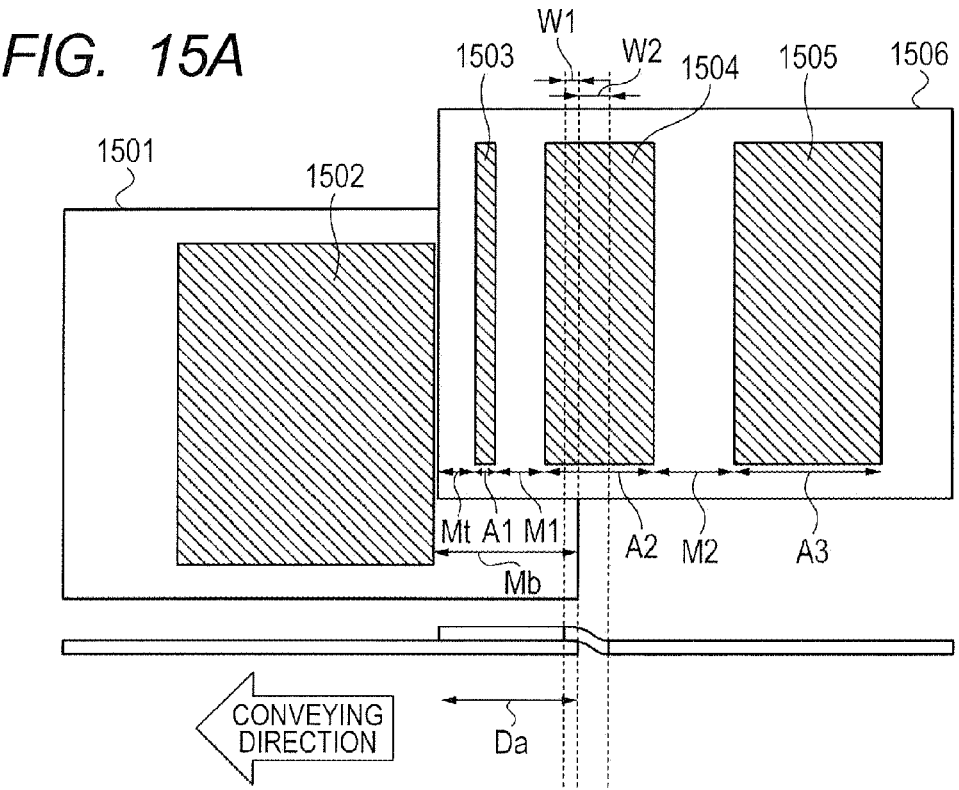
FIGS. 15A and 15B are views for illustrating the concept of an overlapping state according to the second embodiment.
Figure 15B:
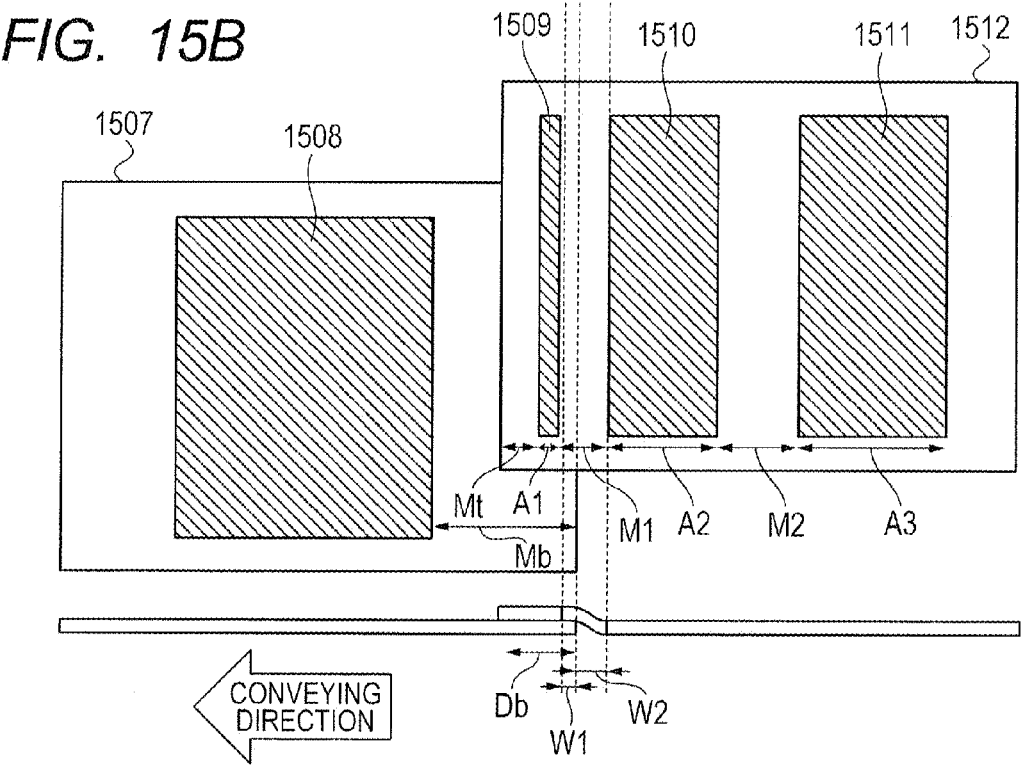

FIG. 15A and FIG. 15B are views for illustrating a relationship between the leading end margin amount Mt, the blank region Mn, and the print region An of the subsequent page in the second embodiment. As described above with reference to FIG. 8, when the attribute information is contained in the print data, the print region can be more finely divided into the character region, the image region, the color region, and the black region. Further, a pattern of the image region can be analyzed in advance so that the print region is further divided into a solid image, a horizontal ruled line, and a natural image. As a result, a natural image region and a horizontal ruled line region in which the image distortion is hardly recognized even when the recording is performed on the stepwise region are treated as the blank regions. The character region and the solid image region in which the image distortion is likely to be recognized when the recording is performed on the stepwise region may be directly treated as the print regions.

In Step S1306, the stepwise region width is acquired based on a kind of sheet. The acquisition operation is the same as that performed in Step S1006 illustrated in FIG. 10. In Step S1307, the overlapping amount is calculated.

FIG. 14A and FIG. 14B are flowcharts for illustrating operations of calculating the overlapping amount in relation to the second embodiment. FIG. 14A is a flowchart for illustrating an operation of calculating the overlapping amount without the second embodiment, whereas FIG. 14B is a flowchart for illustrating an operation of calculating the overlapping amount with the second embodiment. Programs corresponding to the flowcharts illustrated in FIG. 14A and FIG. 14B are stored in the ROM 202 as applications for the overlapping sheet feeding operation. The MPU 201 executes the programs on the RAM 203, thereby realizing the operations illustrated in FIG. 14A and FIG. 14B.

An overlapping amount Da is indicated in the flowchart of FIG. 14A, whereas an overlapping amount Db is indicated in the flowchart of FIG. 14B.

The flowchart illustrated in FIG. 14A is described. In Step S1402, the trailing end margin amount Mb is set as the overlapping amount Da. The image is recorded even on the overlapping region. Therefore, the trailing end margin amount Mb is always set as the overlapping amount Da regardless of the leading end margin amount Mt. As a result, according to the flowchart of FIG. 14A for illustrating the operation of calculating the overlapping amount without the second embodiment, the printing is performed even on the stepwise region.

In the flowchart illustrated in FIG. 14B, similarly to Step S1402, the trailing end margin amount Mb is used as an initial value so that the trailing end margin amount Mb is set as the overlapping amount Db in Step S1405. After that, the following process is performed. Thereby, the overlapping amount Db is updated so that the printing is not performed on the stepwise region. In Step S1406, it is determined whether or not the print data in the stepwise region with the current overlapping amount Db corresponds to the blank region. For example, the stepwise region (W1+W2) illustrated in FIG. 15A is contained in the print region A2. Therefore, it is determined that the print data does not correspond to the blank region. When it is determined that the print data does not correspond to the blank region, the overlapping amount Db is updated in Step S1407. For example, a predetermined fixed step amount S is subtracted from the overlapping amount Db, and the overlapping amount Db is updated. A distance to a next blank region start position may be calculated as the step amount S based on the result of calculation of the blank region in Step S1305.

After that, it is determined whether or not the updated overlapping amount Db is a negative value (Step S1408). When the updated overlapping amount Db is not a negative value, the process returns to Step S1406. When it is determined in Step S1406 that the print data in the stepwise region entirely corresponds to the blank region, the overlapping amount determination process is terminated. When the overlapping amount Db is a negative value, the overlapping amount Db is set to 0 in Step S1409. Then, the overlapping amount calculating process is terminated.

When the recording image region is divided into the character region, the image region, the color region, and the black region based on the attribute information in Step S1305, the above-mentioned regions may be used for the determination in Step S1406. Specifically, when it is determined in Step S1406 that the print data corresponds to none of the character region, the image region, the color region, and the black region, the print data in the stepwise region may be determined as corresponding to the blank region.

Returning to FIG. 13, the conveying amount of the preceding sheet 1-A is determined based on the overlapping amount calculated in Step S1308, and the subsequent page is printed. After that, in Step S1303, it is determined whether or not the current page is the final page.

FIG. 15A and FIG. 15B are views, each for illustrating the concept of the overlapping state according to the second embodiment. The overlapping states illustrated in FIG. 15A and FIG. 15B respectively correspond to the flowcharts of FIG. 14A and FIG. 14B for illustrating the operation of calculating the overlapping amount.

In regions 1502, 1503, 1504, 1505, 1508, 1509, 1510, and 1511, a printed image or a printed character image is present. As illustrated in FIG. 15A, in the overlapping amount calculating process without the second embodiment, the printing is performed on the stepwise region (W1+W2). In the second embodiment, when the blank region for the amount equal to the stepwise region (W1+W2) is present on the subsequent sheet 1-B as illustrated in FIG. 15B, the printing is not performed on the stepwise region.

As described above, when the image is recorded on the overlapping region with the second embodiment, the overlapping amount is calculated so that the image is not recorded on the region of the upper sheet in the overlapping region, which is located in the vicinity of the boundary between the region under which the lower sheet is present and the region under which the lower sheet is not present.

According to the present invention, the plurality of recording sheets overlap each other and are conveyed to the recording unit. There is provided an effect of preventing the printed image from being distorted in the vicinity of the boundary between the region under which the preceding sheet is present and the region under which the preceding sheet is not present over the subsequent sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101186, filed May 18, 2015, which is hereby incorporated by reference herein in its entirety.

What is claimed is:

1. An image recording apparatus, comprising:
a recording unit recording an image on a recording sheet;
a conveying unit conveying a plurality of recording sheets in an overlapping state to the recording unit; and
a setting unit setting an overlapping amount so that the image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other,
wherein an inclined portion corresponding to the predetermined range occurs by overlapping the subsequent sheet and the preceding sheet, and
wherein the recording unit, the conveying unit and the setting unit are implemented by a processor executing a program to function as each of the units.

2. An image recording apparatus according to claim 1, wherein the region of the predetermined range is one of a region located downstream of the boundary in a conveying direction of the recording sheet and a region located upstream of the boundary in the conveying direction.

3. An image recording apparatus according to claim 1, wherein the region of the predetermined range is a region in which the subsequent sheet is warped.

4. An image recording apparatus according to claim 1, wherein the region of the predetermined range corresponds to the inclined portion between the boundary and a part of the subsequent sheet which is held in contact with a platen plate.

5. An image recording apparatus according to claim 1, wherein a leading end margin amount in the subsequent sheet is compared to a value obtained by adding a length of the inclined portion in a conveying direction of the recording sheet to a trailing end margin amount in the preceding sheet,
when the leading end margin amount is smaller than the value obtained by adding the length of the inclined portion to the trailing end margin amount, a value obtained by subtracting the length of the inclined portion from the leading end margin amount is set as the overlapping amount, and
when the value obtained by adding the length of the inclined portion to the trailing end margin amount is smaller than the leading end margin amount, the trailing end margin amount is set as the overlapping amount.

6. An image recording apparatus according to claim 1, further comprising a blank region detecting unit configured to detect an in-page blank region in the image,
wherein the overlapping amount is set based on a trailing end margin of the preceding sheet, a leading end margin of the subsequent sheet, the predetermined range, and the in-page blank region of the subsequent sheet,
wherein the blank region detecting unit is implemented by the processor.

7. An image recording apparatus according to claim 1, wherein the predetermined range is changed depending on a kind of sheet.

8. An image recording apparatus according to claim 1, further comprising an attribute detecting unit configured to detect at least one attribute of a character region, an image region, a color region, or a black region in the image, wherein the overlapping amount is set based on a trailing end margin of the preceding sheet, a leading end margin of the subsequent sheet, the predetermined range, and the attribute, wherein the attribute detecting unit is implemented by the processor.

9. A method of controlling an image recording apparatus, comprising:

setting an overlapping amount so that an image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other;

conveying the subsequent sheet and the preceding sheet in an overlapping state; and recording the image on the subsequent sheet, wherein an inclined portion corresponding to the predetermined range occurs by overlapping the subsequent sheet and the preceding sheet.

10. A method of controlling an image recording apparatus according to claim 9, wherein the region of the predetermined range is one of a region located downstream of the boundary in a conveying direction of the subsequent sheet and the preceding sheet and a region located upstream of the boundary in the conveying direction.

11. A method of controlling an image recording apparatus according to claim 9, wherein the region of the predetermined range is a region in which the subsequent sheet is warped.

12. A method of controlling an image recording apparatus according to claim 9, wherein the region of the predetermined range corresponds to the inclined portion located between the boundary and a part of the subsequent sheet which is held in contact with a platen plate.

13. A method of controlling an image recording apparatus according to claim 9, further comprising comparing a leading end margin amount in the subsequent sheet to a value obtained by adding a length of the inclined portion in a conveying direction of the recording sheet to a trailing end margin amount in the preceding sheet;

setting a value obtained by subtracting the length of the inclined portion from the leading end margin amount as the overlapping amount when the leading end margin amount is smaller than the value obtained by adding the length of the inclined portion to the trailing end margin amount; and setting the trailing end margin amount as the overlapping amount when the value obtained by adding the length of the inclined portion to the trailing end margin amount is smaller than the leading end margin amount.

14. A method of controlling an image recording apparatus according to claim 9, further comprising detecting an in-page blank region in the image, wherein the overlapping amount is set based on a trailing end margin of the preceding sheet, a leading end margin of the subsequent sheet, the predetermined range, and the in-page blank region of the subsequent sheet.

15. A method of controlling an image recording apparatus according to claim 9, further comprising changing the predetermined range depending on a kind of sheet.

16. A method of controlling an image recording apparatus according to claim 9, further comprising detecting at least one attribute of a character region, an image region, a color region, or a black region in the image, wherein the overlapping amount is set based on a trailing end margin of the preceding sheet, a leading end margin of the subsequent sheet, the predetermined range, and the attribute.

17. A non-transitory computer-readable storage medium having a program stored thereon, the program causing an image recording apparatus to execute:

setting an overlapping amount so that an image is prevented from being printed on a region of a predetermined range which includes a boundary between an overlapping portion, in which a subsequent sheet and a preceding sheet overlap each other, and a non-overlapping portion, in which the subsequent sheet and the preceding sheet do not overlap each other;

conveying the subsequent sheet and the preceding sheet in an overlapping state; and recording the image on the subsequent sheet, wherein an inclined portion corresponding to the predetermined range occurs by overlapping the subsequent sheet and the preceding sheet.

* * * * *